United States Patent [19]

Fischer et al.

[11] Patent Number: 5,989,153
[45] Date of Patent: Nov. 23, 1999

[54] DEVICE FOR DRIVING A TORQUE TRANSMISSION SYSTEM

[75] Inventors: Robert Fischer, Bühl; Oliver Amendt, Bühl-Vimbuch; Michael Reuschel, Bühl, all of Germany

[73] Assignee: LuK Getriebe-Systeme GmbH, Buhl/Baden, Germany

[21] Appl. No.: 08/973,917
[22] PCT Filed: Apr. 22, 1997
[86] PCT No.: PCT/DE97/00805
  § 371 Date: Apr. 21, 1998
  § 102(e) Date: Apr. 21, 1998
[87] PCT Pub. No.: WO97/40284
  PCT Pub. Date: Oct. 30, 1997

[30] Foreign Application Priority Data

Apr. 23, 1996 [DE] Germany .................. 196 16 055

[51] Int. Cl.⁶ ........................................... B60K 23/00
[52] U.S. Cl. ........................................ 477/74; 477/84
[58] Field of Search ................................ 477/74, 84

[56] References Cited

U.S. PATENT DOCUMENTS

| | | | |
|---|---|---|---|
| 4,618,043 | 10/1986 | Hattori et al. | 477/84 |
| 5,176,234 | 1/1993 | Reik et al. | 477/74 |
| 5,632,706 | 5/1997 | Kremmling et al. | 477/74 |

FOREIGN PATENT DOCUMENTS

| | | |
|---|---|---|
| 4011850 A 1 | 10/1990 | Germany . |
| 4426260 A 1 | 2/1995 | Germany . |
| 19504 847 A 1 | 9/1995 | Germany . |

Primary Examiner—Dirk Wright
Attorney, Agent, or Firm—Darby & Darby

[57] ABSTRACT

There is disclosed a system for controlling creeping movements of a motor vehicle having a power train with an automated clutch between the engine and the transmission, an electronic control unit for the clutch, and sensors which transmit to the control unit signals denoting the condition of one or more brakes, the positions of an operator-actuatable load lever for the engine, and others. Signals from the control unit are utilized to operate the clutch and, to this end, the control unit includes an arrangement for effecting a creeping movement of the vehicle when the transmission is in gear, the brake or brakes is or are idle, and the load lever is actuated. Such arrangement can effect the transmission of torque in accordance with at least one first predeterminable function to thus induce a creeping movement of the vehicle. The control unit further includes a device for effecting a starting movement of the vehicle in response to actuation of the load lever while the brake is or are idle and the transmission is in gear; such device includes an assembly for selecting the transmission of torque by the clutch in accordance with at least one second predeterminable factor.

43 Claims, 24 Drawing Sheets

Legend
nm: engine RPM
nh: transmission RPM
tp_4: Msoll
tp_2: maximum gas pedal
tp_1: gas pedal Legend
nm: engine RPM
nh: transmission RPM
tp_4: Msoll
tp_2: maximum gas pedal
tp_1: gas pedal

DEVICE FOR DRIVING A TORQUE TRANSMISSION SYSTEM

BACKGROUND OF THE INVENTION

The invention relates to an apparatus for controlling a torque transmitting system in the power train of a motor vehicle with an engine, a torque transmitting system and a transmission, with an actuating unit, such as an actuator, which is controllable by a control unit to actuate, such as engage and/or disengage, the torque transmitting system or for the selection of the torque which can be transmitted by the torque transmitting system, and with a control unit which is in signal transmitting communication with sensors and, if necessary, other electronic units.

Such apparatus became known from DE-OS 40 11 850, DE-OS 44 26 260 and DE-OS 195 04 847. Motor vehicles which are equipped with such apparatus normally comprise a combustion engine or another driving unit; for example, one can provide a hybrid system with a combustion engine and an energy storing device and/or an electric motor. The torque transmitting system which is disposed in the power train to establish a driving connection can be controlled in an automated manner by means of an actuator, such as an actuating unit in order to be engaged and/or disengaged. The transmission can be a manually operable gear shift transmission or an automated transmission with automatically controlled gear shift. The transmission can operate with or without interruption of pulling force.

OBJECTS OF THE INVENTION

An object of the present invention is to provide an apparatus of the above outlined character and a method which permit a comfortable driving, such as starting, creeping or shunting of the vehicle and establish a comfortable transition between various possible operating conditions. Furthermore, there is to be provided an apparatus which can be produced at a reasonable cost while at the same time exhibiting the required comfort characteristics as concerns the operation of the vehicle in actual use.

Another object of the invention is to provide an apparatus which constitutes an improvement over conventional apparatus and at the same time ensures a reduction of wear and a higher reliability in actual use.

SUMMARY OF THE INVENTION

In accordance with the inventive concept, this is accomplished in that the control unit initiates a creeping movement while the transmission is in gear, the brakes are not applied and the load lever is not actuated in that the control unit ascertains and selects a clutch torque in accordance with at least one preselectable function to thus cause the vehicle to perform a creeping movement. When the transmission is in gear and the brakes are not applied but the load lever is actuated, the control unit initiates a starting movement in that the then applied clutch torque is ascertained in accordance with at least one preselectable function so that the vehicle is started.

In the following passages of this specification, the term clutch torque will denote that torque which can be transmitted by the clutch and is determined by the control unit to be set in a controlled or regulated manner, for example, by an actuator or an actuating unit.

For example, a creeping operation can be defined in that, when the transmission is in gear, the engine is running and the brakes are not applied, the vehicle is caused to move at least slowly while the driving torque which is then being transmitted is small and the operation of the engine is basically an idling operation while the torque transmitting system is engaged at least to such an extent that it is possible to transmit a relatively small torque. A starting operation is an operation which takes place while the load lever, such as a gas pedal or a master cylinder, is actuated, while the engine operates at an RPM which is higher than the idling RPM and the clutch is at least partially engaged to ensure that the vehicle is set in motion at least at a low speed. The difference between the operations denoted as starting and creeping is primarily in the extent of intentional actuation of the gas pedal by the operator of the motor vehicle.

The preselectable functions for creeping and starting, such as a creeping function or a starting function, are ascertained by resorting to mathematical functions or are determined for example with characteristic curves or characteristic fields to be ascertained by the control unit with resort to a central computer unit.

Furthermore, the above is accomplished with an apparatus of the above outlined character in that the control unit selects, while the transmission is in gear, the brakes are not applied and the load lever is not actuated, a creeping operation at which a controlled clutch torque is determined in accordance with at least one preselectable creeping function so that the vehicle begins to creep. The control unit initiates a starting operation when the transmission is in gear, the brakes are not applied but the load lever is actuated; at such time, the selected clutch torque is ascertained in accordance with at least one preselectable starting function at which the vehicle is started. When the load lever is actuated, a transition from a creeping operation to a starting operation takes place in such a way that the selected clutch torque is shifted from the preselectable creeping function to the preselectable starting function when the clutch torque which has been ascertained with resort to the starting function at least equals the clutch torque which has been ascertained with the creeping function.

However, in accordance with the invention the above can also be accomplished in that, when the transmission is in gear, the brakes are not applied and the load lever is not actuated, the control unit selects a creeping operation at which a regulated clutch torque is determined in accordance with at least one preselectable creeping function at which the vehicle begins to carry out a creeping movement. When the transmission is in gear, the brakes are not applied and the load lever is actuated, the control unit selects a starting operation involving a determination of a selected clutch torque in accordance with at least one preselectable starting function at which the vehicle starts to move. When the load lever is actuated, the transition from a creeping operation to a starting operation takes place in such a way that the selected clutch torque is shifted from the preselectable creeping function to the preselectable starting function when the clutch torque of the starting function reaches a preselectable value.

However, in accordance with the invention the above can also be accomplished in that, when the control unit selects a creeping operation while the transmission is in gear, the brakes are not applied and the load lever is not actuated, at which time a selected clutch torque is ascertained in accordance with at least one preselectable creeping function so that the vehicle begins to creep, and when the control unit selects a starting operation while the transmission is in gear, the brakes are not applied but the load lever is actuated at which time a selected clutch torque is ascertained in accordance with at least one preselectable starting function so that the vehicle is started, the transition from creeping operation to a starting operation in response to actuation of the load lever takes place directly as a result of direct change of the selected clutch torque from the preselectable creeping function to the preselectable starting function.

However, in accordance with the invention the above can be accomplished, too, in that, when the control unit selects a creeping operation while the transmission is in gear, the brakes are not applied and the load lever is not actuated, at which time a selected clutch torque is ascertained in accordance with at least one preselectable creeping function so that the vehicle begins to creep, and when the control unit selects a starting operation while the transmission is in gear, the brakes are not applied but the load lever is actuated at which time a selected clutch torque is ascertained in accordance with at least one preselectable starting function so that the vehicle is started, the transition from creeping operation to starting operation in response to actuation of the load lever takes place directly in that the selected clutch torque is shifted from the preselectable creeping function to the preselectable starting function and the starting function is increased by the actual value of the creeping function.

Still further, the above can be accomplished in accordance with the invention in that, when the control unit selects a creeping operation while the transmission is in gear, the brakes are not applied and the load lever is not actuated, at which time a selected clutch torque is ascertained in accordance with at least one preselectable creeping function so that the vehicle begins to creep, and when the control unit selects a starting operation while the transmission is in gear, the brakes are not applied but the load lever is actuated at which time a selected clutch torque is ascertained in accordance with at least one preselectable starting function so that the vehicle is started, the transition from starting operation to creeping operation takes place in such a way that the selected clutch torque is reduced with resort to a preselectable starting operation terminating function and a shift to the preselectable creeping function takes place when the clutch torque which is determined with the starting operation terminating function at least matches or is less than the clutch torque which is ascertained with resort to the creeping function.

In accordance with a further inventive concept, the above can also be accomplished in that, when the control unit selects a creeping operation while the transmission is in gear, the brakes are not applied and the load lever is not actuated, at which time a selected clutch torque is ascertained in accordance with at least one preselectable creeping function so that the vehicle begins to creep, and when the control unit selects a starting operation while the transmission is in gear, the brakes are not applied but the load lever is actuated at which time a selected clutch torque is ascertained in accordance with at least one preselectable starting function so that the vehicle is started, a termination of actuation of the load lever in the course of a starting operation effects a transition from starting operation to creeping operation in such a way that the selected clutch torque is immediately determined and selected in accordance with the creeping function.

The above can also be accomplished in that, when the control unit selects a creeping operation while the transmission is in gear, the brakes are not applied and the load lever is not actuated, at which time a selected clutch torque is ascertained in accordance with at least one preselectable creeping function so that the vehicle begins to creep, and when the control unit selects a starting operation while the transmission is in gear, the brakes are not applied but the load lever is actuated at which time a selected clutch torque is ascertained in accordance with at least one preselectable starting function so that the vehicle is started, a termination of actuation of the load lever in the course of a starting operation entails a termination of the starting operation in such a way that the selected clutch torque is reduced essentially to zero by resorting to a starting operation terminating function, and the creeping operation is started thereafter by resorting to the creeping function.

The above can also be accomplished in that, when the control unit selects a creeping operation while the transmission is in gear, the brakes are not applied and the load lever is not actuated, at which time a selected clutch torque is ascertained in accordance with at least one preselectable creeping function so that the vehicle begins to creep, and when the control unit selects a starting operation while the transmission is in gear, the brakes are not applied but the load lever is actuated at which time a selected clutch torque is ascertained in accordance with at least one preselectable starting function so that the vehicle is started, a termination of actuation of the load lever in the course of a starting operation entails a termination of the starting operation in such a way that the selected clutch torque is reduced essentially to zero with resort to a preselectable starting operation terminating function, the clutch torque is thereupon maintained at a constant value for a preselectable period of time, and the creeping operation is initiated thereafter with resort to a creeping function.

In accordance with the above outlined invention, it can be of advantage if the clutch torque which has been selected by the control unit and can be transmitted by the torque transmitting system is set by the actuating unit which is controllable by the control unit.

It can also be of advantage if the creeping torque which is selectable as clutch torque to initiate a creeping movement of the vehicle is determined in accordance with a preselectable function of time, such creeping function being determined by the control unit. Furthermore, it can be of advantage if the creeping torque is ascertained within at least one interval of time with a preselectable function of time.

Still further, it can be of advantage if the creeping torque is ascertained within at least two intervals of time with resort to at least two functions of time.

In accordance with the inventive concept, it can be of advantage when the development of creeping torque within two intervals of time, each with a discrete function of time, is selected in such a way that, during the first interval of time the creeping torque is caused to rise from a value which is essentially zero to a first preselectable value with resort to a first function, and that during a second time interval the creeping torque is caused to rise above the preselectable value. For example, the preselectable point can be the engagement point or the measuring point.

Still further, it can be of advantage if, during a second time interval, the creeping torque is increased from a preselectable value to a maximum value and thereupon remains essentially constant.

Furthermore, it is of advantage if, during a third interval of time, the creeping torque is reduced from a maximum value to a lower value.

It is equally advantageous if the determination, such as an increase or a reduction of the creeping torque, takes place by resorting to a linear, square, exponential or another function of time.

In accordance with an inventive concept, it is advantageous if an increase of the creeping torque takes place at a higher speed during a first time interval than during other time intervals.

Still further, it can be of advantage if the preselectable value is an engagement point of the clutch which is characterised in that, in response to selection of such engagement point, there takes place a noticeable reaction, such as a noticeable rise of torque, and the engagement point is the point at which the transmission of torque begins.

In accordance with a novel concept, it is also desirable if, in response to a termination of the creeping operation, for example in response to the application of a brake, the creeping torque is reduced to a preselectable value in dependency upon at least one function of time.

Furthermore, it can be of advantage if, in the case of a termination of the creeping operation, for example, in response to the application of a brake, the creeping torque is reduced to a preselectable value during a first interval of time in accordance with at least one function of time and is reduced to a preselectable value during at least one second interval of time.

Furthermore, it can be of advantage if the reduction takes place to a preselectable value, and such preselectable value is a low value or essentially zero. For example, the low value can be a value corresponding to the prevailing drag torques.

It is of advantage if the starting function is a preselectable function of at least one operational parameter. It can be of equal advantage if the starting function is a preselectable function of the engine RPM or of the engine RPM and/or the position of the load lever or of the flap of the throttle valve.

It can be of advantage if the starting operation terminating function is a preselectable function of at last one operational parameter.

It can be equally advantageous if the starting operation terminating function is a function of the engine RPM according to which the selected clutch torque is reduced upon completion of the starting operation.

In accordance with the inventive concept, it can be of additional advantage if the starting operation terminating function is a preselectable function of time according to which the selected clutch torque is reduced upon completion of the starting operation.

It can also be of advantage if, upon completion of the starting operation as a result of the application of a brake, the selected clutch torque is reduced to a value of essentially zero or to a low value by resorting to a preselectable starting operation terminating function. Still further, the torque can be reduced to the creeping torque.

By means of implemented processes or programs, the control unit resembles or constitutes function generators which furnish a creeping function, a starting function and a starting operation terminating function in dependency upon preselectable parameters. For example, the preselectable parameters can be the time, rotational speeds such as for example the engine RPM and/or a transmission RPM such as the transmission input RPM. Still further, it is possible to employ coefficients of function by means of characteristic fields, characteristic curves and/or characteristic values which can be resorted to for the determination of a creeping torque, a starting torque and/or a starting operation terminating torque.

Still further, the control unit can embody comparing arrangements or it imitates such arrangements in order to render it possible to compare the individual ascertained or calculated momentary values of individual functions, such as for example creeping or starting functions, with each other or with a reference value, and such comparisons can lead to conclusions whether or not a setting will be decided upon during transition from one function to another. For example, in the event of a transition from the function or operating condition creeping to starting, the creeping torque is compared with the starting torque in order to decide upon the function, such as creeping- or starting function, according to which the transmissible clutch torque will be selected. Such comparator arrangements can be implemented with hard- or software.

It can be equally advantageous if the creeping function for selection of the creeping operation is selected in accordance with a preselectable function of at least one operational parameter. Still further, it can be of advantage if the creeping function is selected in accordance with a preselectable function of time.

It can be of advantage if the preselectable interval of time, during which the clutch torque remains essentially constant, is within the time range of between 1 millisecond and 10 seconds; preferably the time interval will be selected to be within the range of between 0.5 second and 5 seconds.

It can also be of advantage if, during the preselectable interval of time, the clutch torque is essentially zero.

Still further, it can be of advantage if, during the preselectable interval of time, the clutch torque assumes a preselectable value other than zero.

Still further, it can be of advantage if at least one of the functions, such as the creeping function, the starting function, the creeping operation terminating function or the starting operation terminating function, is a function of at least one operational parameter such as, for example, time, engine RPM, transmission input RPM, the position of the load lever, the angle of the flap of the throttle valve, of the slip as a difference between the engine- and the transmission input RPM, the speed of the vehicle or another value.

In accordance with the inventive concept, it can also be of advantage if an apparatus for the control of a torque transmitting system in the power train of a motor vehicle with an engine, a torque transmitting system and a transmission, with an actuating unit, such as an actuator for actuation—such as engagement and/or disengagement—of the torque transmitting system, with a control unit which is in signal transmitting connection with sensors and, if necessary, other electronic units, is designed to ensure that the control unit can initiate a creeping movement when the transmission is in gear, the brakes are not applied and the load lever is not actuated, and the control unit then initiates the transmission of a controlled clutch torque in accordance with at least one preselectable creeping function at which the vehicle is caused to creep. The control unit is designed to initiate a starting operation when the transmission is in gear, the brakes are not applied and the load lever is actuated, at which time the control unit ascertains a preselected clutch torque in accordance with at least one preselectable starting function and the vehicle is set in motion. In response to actuation of the load lever, a transition from a creeping operation to a starting operation takes place in such a way that a direct change is effected from the preselectable creeping function to the preselectable starting function to determine the clutch torque.

In this connection, it can be of particular advantage if the preselectable value is a fraction or a multiple of the creeping torque.

In accordance with another inventive concept, it can be of advantage if a method of operating, such as controlling or regulating, a torque transmitting system is practiced particularly by resorting to an apparatus which is constructed in accordance with one of the aforedescribed embodiments.

In accordance with a further inventive concept, it is of advantage in an apparatus for controlling an automated clutch in the power train of a motor vehicle with a motor, a clutch and a transmission, with an actuating unit, such as actuator, which is controllable by a control unit to actuate, such as engage and/or disengage, the clutch, with a control unit which is in signal transmitting connection with sensors, if the control unit initiates a creeping operation while the transmission is in gear, the brakes are not applied and the load lever is not actuated at which a controlled clutch torque is ascertained in accordance with at least one preselectable creeping function to initiate a creeping movement of the vehicle, and if the control unit initiates a starting movement while the transmission is in gear, the brakes are not applied and the load lever is actuated at which a controlled clutch torque is ascertained in accordance with at last one preselectable starting function at which the vehicle is started and, while the load lever is actuated, a transition from a creeping operation to a starting operation is effected in such a way that the controlled clutch torque shifts from the preselectable creeping function to the preselectable starting function when the clutch torque which has been ascertained in accordance with the starting function at least equals the clutch torque which has been ascertained in accordance with the creeping function.

It is also desirable if the control unit initiates a creeping operation while the transmission is in gear, the brakes are not applied and the load lever is not actuated at which a controlled clutch torque is ascertained in accordance with at least one preselectable creeping function to initiate a creeping movement of the vehicle, and if the control unit initiates a starting movement while the transmission is in gear, the brakes are not applied and the load lever is actuated at which a controled clutch torque is ascertained in accordance with at least one preselectable starting function at which the vehicle is started and, while the load lever is actuated, a transition from a creeping operation to a starting operation takes place in such a way that the controlled clutch torque shifts from the preselectable creeping function to the preselectable starting function when the clutch torque of the starting function reaches a preselectable value.

It is of particular advantage if the control unit initiates a creeping movement while the transmission is in gear, the brakes are not applied and the load lever is not actuated at which a controlled clutch torque is ascertained in accordance with at least one preselectable creeping function to initiate a creeping movement of the vehicle, and if the control unit initiates a starting movement while the transmission is in gear, the brakes are not applied and the load lever is actuated at which a controlled clutch torque is ascertained in accordance with at least one preselectable starting function at which the vehicle is started and, while the load lever is actuated, a transition from a creeping operation to a starting operation takes place in such a way that the controlled clutch torque shifts directly from the preselectable creeping function to the preselectable starting function.

Furthermore, it is of advantage if the control unit initiates a creeping movement while the transmission is in gear, the brakes are not applied and the load lever is not actuated at which a controlled clutch torque is ascertained in accordance with a preselectable creeping function to initiate a creeping movement of the vehicle, and if the control unit initiates a starting movement while the transmission is in gear, the brakes are not applied and the load lever is not actuated at which a controlled clutch torque is ascertained in accordance with a preselectable creeping function to initiate a creeping movement of the vehicle, and if the control unit initiates a starting movement while the transmission is in gear, the brakes are not applied and the load lever is actuated at which a controlled clutch torque is ascertained in accordance with a preselectable starting function at which the vehicle is started and, while the load lever is actuated, a transition from a creeping operation to a starting operation takes place directly in that the controlled clutch torque shifts from the preselectable creeping torque to the preselectable starting torque, the starting function being increased by the actual value of the creeping function.

It is of particular advantage if the control unit initiates a creeping movement while the transmission is in gear, the brakes are not applied and the load lever is not actuated at which a controlled clutch torque is ascertained in accordance with a preselectable creeping function to initiate a creeping movement of the vehicle, and if the control unit initiates a starting movement while the transmission is in gear, the brakes are not applied and the load lever is actuated at which a controlled clutch torque is ascertained in accordance with a preselectable starting function at which the vehicle is started and, when the actuation of the load lever is terminated in the course of the starting operation, a transition from a starting operation to a creeping operation takes place in such a way that the controlled clutch torque is reduced with resort to a preselectable starting operation terminating function and a shift to the preselectable creeping function takes place when the clutch torque which is determined with the starting operation terminating function, at most equals or is less than the clutch torque which has been ascertained by way of the creeping function.

In accordance with a further inventive concept, it is of advantage if the control unit initiates a creeping movement while the transmission is in gear, the brakes are not applied and the load lever is not actuated at which a controlled clutch torque is ascertained in accordance with a preselectable creeping function to initiate a creeping movement of the vehicle, and if the control unit initiates a starting movement while the transmission is in gear, the brakes are not applied and the load lever is actuated at which a controlled clutch torque is ascertained in accordance with a preselectable starting function at which the vehicle is started and, when the actuation of the load lever is terminated in the course of the starting operation, a transition from a starting operation to a creeping operation takes place in such a way that the controlled clutch torque is determined and controlled in accordance with the creeping function immediately upon termination of actuation of the load lever.

It is equally of advantage if the control unit initiates a creeping movement while the transmission is in gear, the brakes are not applied and the load lever is not actuated at which a controlled clutch torque is ascertained in accordance with a preselectable creeping function to initiate a creeping movement of the vehicle, and if the control unit initiates a starting movement while the transmission is in gear, the brakes are not applied and the load lever is actuated at which a controlled clutch torque is ascertained in accordance with a preselectable starting function at which the vehicle is started and, when the actuation of the load lever is terminated in the course of a starting operation, a cessation of the starting operation takes place in such a way that the controlled clutch torque is reduced essentially to zero by resorting to a starting operation terminating function and this is followed by a creeping operation with resort to a creeping function.

It is further of advantage if the control unit initiates a creeping movement while the transmission is in gear, the brakes are not applied and the load lever is not actuated at which a controlled clutch torque is ascertained in accordance with a preselectable creeping function to initiate a creeping movement of the vehicle, and if the control unit initiates a starting movement while the transmission is in gear, the brakes are not applied and the load lever is actuated at which a controlled clutch torque is ascertained in accordance with a preselectable starting function at which the vehicle is started and, when the actuation of the load lever is terminated in the course of a starting operation, a cessation of the starting operation takes place in such a way that the controlled clutch torque is reduced essentially to zero by resorting to a preselectable starting operation terminating function, the clutch torque is thereupon maintained esssentially at a constant value for a preselectable period of time, and a creeping operation is initiated thereafter by resorting to a creeping function.

The aforedescribed creeping function is a function which is utilized for the selection of torque adapted to be transmitted by the clutch in order to initiate a creeping movement of the vehicle. For example, this function can be a function of time or of other vehicle parameters. For example, such creeping function can be ascertained on the basis of characteristic curves or characteristic fields or it can be determined on the basis of numerical processes. This renders it possible to ascertain and control a creeping torque at each operating point of the vehicle and at given vehicle parameters, provided that the circumstances permit this, such as while the motor is running, the transmission is in gear and the gas pedal or load lever is not actuated. The aforedescribed starting function is a function which is utilized to select the torque adapted to be transmitted by the clutch in order to initiate a starting of the vehicle. For example, this function can be a function of time or of other vehicle parameters. For example, such starting function can be ascertained from characteristic curves or characteristic fields or it can be ascertained on the basis of numerical processes. Thus, a starting torque can be ascertained and controlled at each operating point of the vehicle at given vehicle parameters when the circumstances permit it, such as while the motor is running, the transmission is in gear and the gas pedal or load lever is actuated. The aforedescribed creep terminating function and the starting operation terminating function are functions which are utilized to control the torque adapted to be transmitted by the clutch in order that the vehicle terminate a creeping operation or a starting operation; for example, such functions can be functions of time or they can depend upon other vehicle parameters. Such a creep terminating function or starting operation terminating function can be ascertained, for example, on the basis of characteristic curves or characteristic fields, or it can be ascertained with resort to numerical processes. Thus, a torque can be ascertained and controlled at each operating point of the vehicle at given vehicle parameters if the circumstances are right, such as in the event of an aborted or interrupted creeping or starting operation.

The term clutch torque is to be understood to denote the adjustable torque which can be transmitted by the clutch.

The term torque transmitting system is to be understood to denote a clutch for the establishment of an activatable or deactivatable torque transmitting connection in the power train of a vehicle.

Furthermore, and in accordance with a further inventive concept, the invention relates to a method according to which the control unit controls the following method steps:

the control unit controls a creeping operation while the transmission is in gear, the brakes are not applied and the load lever is not actuated, at which a controlled clutch torque is ascertained in accordance with at least one preselectable creeping function at which the vehicle begins to creep, the control unit regulates a starting operation while the transmission is in gear, the brakes are not applied and the load lever is actuated, at which a controlled clutch torque is ascertained in accordance with at least one preselectable starting function at which the vehicle is started, the control unit controls a transition from a creeping operation to a starting operation upon actuation of the load lever in such a way that the selected clutch torque shifts from the preselectable creeping function to the preselectable starting function when the clutch torque which has been determined with resort to the starting function at least equals the clutch torque ascertained with resort to the creeping function.

It can be of advantage, too, if one carries out the following method steps:

the control unit controls a creeping operation while the transmission is in gear, the brakes are not applied and the load lever is not actuated, at which a controlled clutch torque is ascertained in accordance with at least one preselectable creeping function at which the vehicle begins to creep, the control unit controls a starting operation while the transmission is in gear, the brakes are not applied and the load lever is actuated, at which a controlled clutch torque is ascertained in accordance with at least one preselectable starting function at which the vehicle is started, the control unit controls a transition from a creeping operation to a starting operation, in response to actuation of the load lever, in such a way that the selected clutch torque shifts from the preselectable creeping function to the preselectable starting function when the clutch torque of the starting function reaches a preselectable value.

It can also be of advantage to carry out the following method steps:

the control unit controls a creeping operation while the transmission is in gear, the brakes are not applied and the load lever is not actuated, at which a controlled clutch torque is ascertained in accordance with at least one preselectable creeping function at which the vehicle begins to creep, the control unit controls a starting operation while the transmission is in gear, the brakes are not applied and the load lever is actuated, at which a controlled clutch torque is ascertained in accordance with at least one preselectable starting function at which the vehicle is started, the control unit controls a transition from a creeping operation to a starting operation, in response to actuation of the load lever, in such a way that the selected clutch torque shifts immediately from the preselectable creeping function to the preselectable starting function.

Furthermore, it can be of advantage to carry out the following method steps:

the control unit controls a creeping operation while the transmission is in gear, the brakes are not applied and the load lever is not actuated, at which a controlled clutch torque is ascertained in accordance with a preselectable creeping function at which the vehicle begins to creep, the control unit controls a starting operation while the transmission is in gear, the brakes are not applied and the load lever is actuated, at which a controlled clutch torque is ascertained in accordance with a preselectable starting function at which the vehicle is started, the control unit controls a transition from a creeping operation to a starting operation, in response to actuation of the load lever, in that a change of the selected clutch torque from the preselectable creeping function to the preselectable starting function takes place directly, the starting function being increased by the actual value of the creeping function.

Furthermore, it can be of advantage to carry out the following method steps:

the control unit controls a creeping operation while the transmission is in gear, the brakes are not applied and the load lever is not actuated, at which a controlled clutch torque is ascertained in accordance with a preselectable creeping function at which the vehicle begins to creep, the control unit controls a starting operation while the transmission is in gear, the brakes are not applied and the load lever is actuated, at which a controlled clutch torque is ascertained in accordance with a preselectable starting function at which the vehicle is started, the control unit controls a transition from a starting operation to a creeping operation in response to a termination of actuation of the load lever in the course of a starting operation in such a way that the selected clutch torque is reduced in accordance with a preselectable starting operation terminating function and a shift takes place to the preselectable creeping function when the clutch torque which has been ascertained with resort to the starting operation terminating function at least equals or is less than the clutch torque determined by means of the creeping function.

Furthermore, it can be of advantage to carry out the following method steps:

the control unit controls a creeping operation while the transmission is in gear, the brakes are not applied and the load lever is not actuated, at which a controlled clutch torque is ascertained in accordance with a preselectable creeping function at which the vehicle begins to creep, the control unit controls a starting operation while the transmission is in gear, the brakes are not applied and the load lever is actuated, at which a controlled clutch torque is ascertained in accordance with a preselectable starting function at which the vehicle is started, the control unit controls a transition from a starting operation to a creeping operation in response to a termination of actuation of the load lever in the course of a starting operation in such a way that the selected clutch torque is determined and controlled by the creeping function immediately upon termination of actuation of the load lever.

Furthermore, it can be of advantage to carry out the following method steps:

the control unit controls a creeping operation while the transmission is in gear, the brakes are not applied and the load lever is not actuated, at which a controlled clutch torque is ascertained in accordance with a preselectable creeping function at which the vehicle begins to creep, the control unit controls a starting operation while the transmission is in gear, the brakes are not applied and the load lever is actuated, at which a controlled clutch torque is ascertained in accordance with a preselectable starting function at which the vehicle is started, the control unit controls a termination of the starting operation in :response to termination of actuation of the load lever in the course of a starting operation in such a way that the selected clutch torque is reduced essentially to zero by resorting to a starting operation terminating function and a creeping operation is initiated thereafter by means of a creeping function.

Still further, it can be of advantage to carry out the following method steps:

the control unit controls a creeping operation while the transmission is in gear, the brakes are not applied and the load lever is not actuated, at which a controlled clutch torque is ascertained in accordance with a preselectable creeping function at which the vehicle begins to creep, the control unit controls a starting operation while the transmission is in gear, the brakes are not applied and the load lever is actuated, at which a controlled clutch torque is ascertained in accordance with a preselectable starting function at which the vehicle is started, the control unit controls a termination of the starting operation in response to a termination of actuation of the load lever in the course of a starting operation in such a way that the selected clutch torque is reduced essentially to zero with resort to a preselectable starting operation terminating function, the clutch torque is thereupon maintained at an essentially constant value for a preselectable period of time, and a creeping operation is initiated thereafter with a creeping function.

The invention will be explained in greater detail with reference to the drawings.

BRIEF DESCRIPTION OF THE DRAWINGS

There are shown in:

| FIG. 1 | a schematic representation of a vehicle, |
|---|---|
| FIG. 2 | a schematic representation of a power train of a vehicle, |
| FIGS. 3a–3d | diagrams, |
| FIG. 4 | a diagram, |
| FIG. 5 | a diagram, |
| FIG. 6 | a diagram, |
| FIG. 7 | a block diagram, |
| FIG. 7a | a block diagram, |
| FIG. 8 | a block diagram, |
| FIG. 9 | a block diagram, |
| FIG. 10 | a block diagram, |
| FIG. 11 | a block diagram, |
| FIG. 12 | a block diagram, |
| FIGS. 13a,13b | block diagrams, |
| FIGS. 14a,14b | block diagrams, |
| FIG. 15 | a block diagram, |
| FIG. 16 | a block diagram, |
| FIG. 17 | a diagram, |
| FIG. 18 | a diagram, |
| FIG. 19 | a diagram, |
| FIG. 20 | a diagram, |
| FIG. 21 | a diagram, |
| FIG. 22 | a diagram, |
| FIG. 23 | a diagram, |
| FIG. 24 | a diagram, |
| FIG. 25 | a diagram, |
| FIG. 25a | a diagram, |
| FIG. 26 | a diagram, and |
| FIG. 26a | a diagram. |

DESCRIPTION OF PREFERRED EMBODIMENTS

Figure 1:
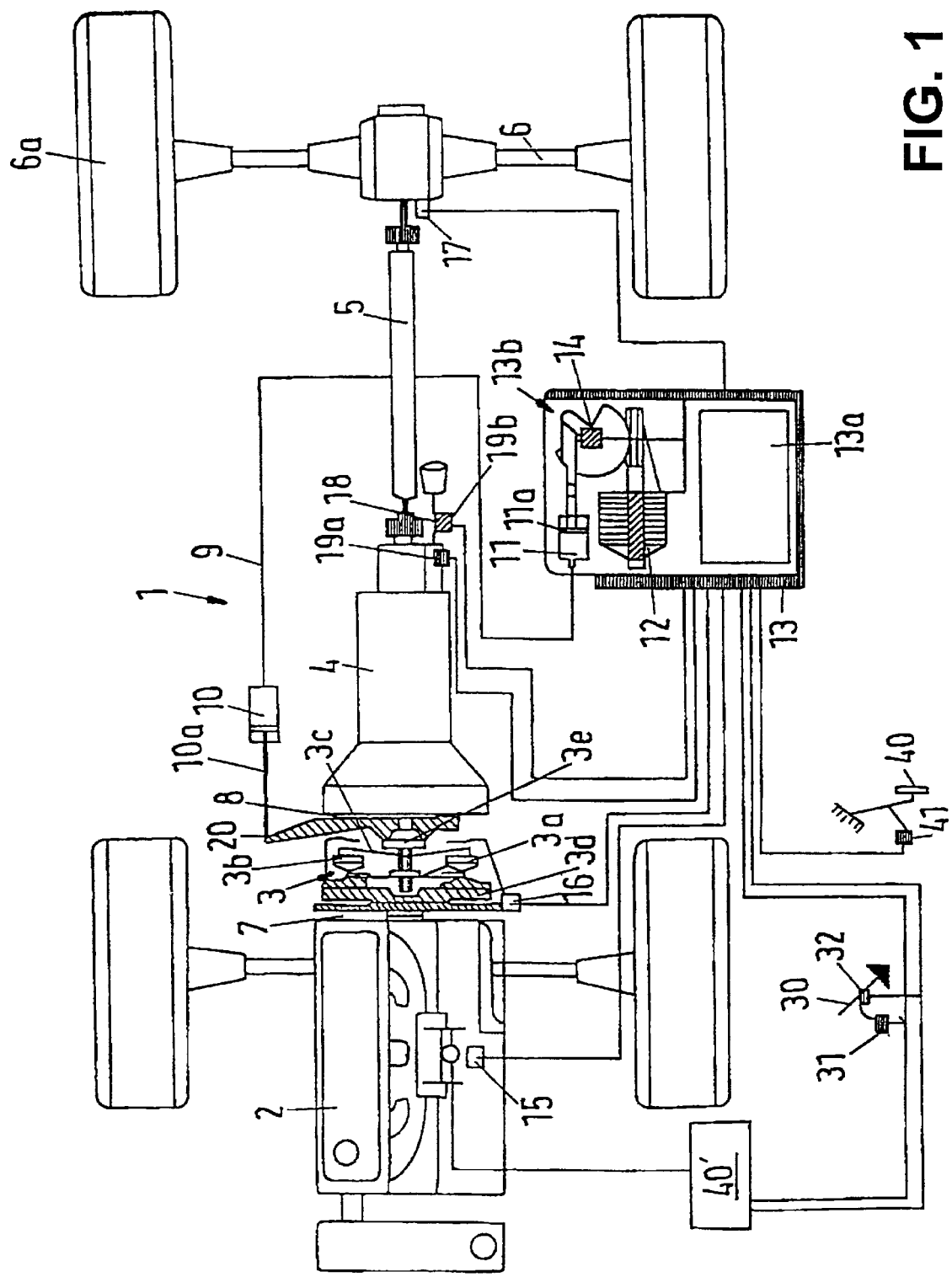

FIG. 1 shows schematically a motor vehicle 1 with a driving unit 2, such as a motor or a combustion engine. There are further shown, in the power train of the motor vehicle, a torque transmitting system 3 and a transmission 4. In this embodiment, the torque transmitting system 3 is disposed in the power flow between the driving unit 2 and the transmission 4 so that driving torque which is supplied by the driving unit is transmitted, by way of the torque transmitting system, to the transmission and from the output of the transmission 4 to a shaft 5 and a downstream axle 6 thence to the wheels 6a.

The torque transmitting system 3 constitutes a clutch, such as a friction clutch, a multiple-disc clutch, a magnetic powder clutch or a torque converter lockup clutch, and the clutch can be a self-adjusting wear compensating clutch. The illustrated transmission 4 is a manually shiftable transmission such as a multistep reduction gear. In accordance with the inventive concept, the transmission can also constitute an automatic range speed gear which can be automatically shifted by means of an actuator. The term automatic range speed gear is to be understood to embrace an automated transmission which can be shifted upon interruption of the pulling force and the shifting into different gears is carried out in a controlled manner by means of at least one actuator.

Still further, it is possible to employ an automatic transmission, namely a transmission basically without interruption of pulling force in the course of the gear shifting operation such as is normally built up of planetary stages.

Furthermore, it is possible to employ an infinitely variable transmission, such as for example a cone drive. An automatic transmission can also be associated with a downstream torque transmitting system 3, such as a clutch or friction clutch. Furthermore, the torque transmitting system can constitute a starter clutch and/or a reversing clutch for changing the direction of rotation, and/or a safety clutch with a controlledly selectable transmissible torque. The torque transmitting system can constitute a dry friction clutch or a wet running friction clutch which, for example, is running in a fluid. It can also constitute a torque converter.

The torque transmitting system 3 comprises an input side 7 and an output side 8, the torque being transmitted from the input side 7 to the output side 8 when the clutch disc 3a is acted upon by the pressure plate 3b, diaphragm spring 3c and the disengaging bearing 3e as well as the flywheel 3d. In order to apply such force, the disengaging lever 20 is acted upon by an actuating means such as an actuator.

The actuation of the torque transmitting system 3 is effected by a control unit 13, such as a control apparatus, which can encompass the control electronics 13a and the actuator 13b. In accordance with another advantageous embodiment, the actuator and the control electronics can be disposed in two discrete structural units, such as housings.

The control unit 13 can comprise the control and power electronics for the operation of the electric motor 12 of the actuator 13b. For example, this can be of advantage because one can achieve that the system requires a single space, namely the space for the actuator with electronics. The actuator 13b comprises a prime mover 12, such as an electric motor, and this electric motor 12 acts upon a master cylinder 11 by way of a gearing such as a worm gearing or a spur gear drive or a crank drive or a feed screw drive. Such action upon the master cylinder can be effected either directly or by way of a linkage.

Movements of the output element of the actuator, such as the master cylinder piston 11a, are monitored by a clutch movement sensor 14 which detects the position or location or velocity or acceleration of a value that is proportional to the position or condition of engagement, of speed or acceleration of the clutch 3. The master cylinder 11 is connected with a slave cylinder 10 by a conduit 9 for a pressurized fluid, such as a hydraulic conduit. The output element 10a of the slave cylinder is operatively connected with the disengaging lever or disengaging means 20 so that a movement of the output element 10a of the slave cylinder 10 causes a movement or pivoting of the disengaging means 20 in order to select the torque to be transmitted by the clutch 3.

The actuator 13b which selects the torque adapted to be transmitted by the torque transmitting system 3 can be operated by a pressurised fluid, i.e., it can be equipped with master and slave cylinders which are operated by a pressurized fluid. For example, the pressurized fluid can be a hydraulic fluid or a pneumatic medium. The master cylinder which is operated with a pressurized fluid can be actuated by an electric motor and such electric motor 12 can be regulated by electronic means. In lieu of an electromotorically operated driving element, the actuator 13b can also employ a different driving element, for example, a fluid-operated driving element. Furthermore, it is possible to employ magnetic actuators as a means for selecting the position of an element.

In a friction clutch, the selection of a torque to be transmitted takes place in such a way that a controlled pressing of the friction linings on the clutch disc takes place between the flywheel 3d and the pressure plate 3b. By properly positioning the disengaging means 20, such as a disengaging fork or a central disengaging element, one can select in a controlled manner the application of force to the pressure plate and hence to the friction linings, the pressure plate being movable between two end positions and being movable to and adapted to be fixed in a selected position. One end position corresponds to the fully engaged condition of the clutch and the other end position to a fully disengaged condition of the clutch. In order to select a transmissible torque which, for example, can be less than the momentarily applied engine torque, one can for example select a position of the pressure plate 3b which is located somewhere between the two end positions. The clutch can be fixed in such condition in response to planned adjustment of the disengaging means 20 in the corresponding position. However, it is also possible to select transmissible clutch torques which are clearly above the momentarily applied engine torques. Under such circumstances, it is possible to transmit the actually prevailing engine torques to thus damp or isolate irregularities of torque which is being transmitted by the power train, e.g., irregularities in the form of peaks of torque.

In order to operate, such as control or regulate, the torque transmitting system, there are further employed sensors which monitor the relevant parameters of the entire system at least at certain times and furnish the information which is necessary for the regulation, such information being furnished in the form of signals or measured values and being processed by the control unit. A signal transmitting connection can be provided and can exist between the control unit and other electronic units, such as for example between the control unit and the engine electronics or other electronics such as those of an antiblocking system (ABS) or an anti-slip regulation (ASR). For example, the sensors detect the rotational speeds, such the wheel RPM, the engine RPM, the position of the load lever, the position of the throttle valve, the momentary gear of the transmission, an intention to shift the transmission and other parameters which are relevant for the operation of the motor vehicle.

FIG. 1 shows that the control unit receives information or measurement values from a throttle valve sensor 15, an engine RPM sensor 16 and a tachometer generator 17. The electronic unit 13*a*, such as a computer unit, of the control unit processes the system input values and transmits control signals to the actuator 13*b*.

The transmission 4 constitutes a gear change box and can be shifted into different gears by a shifting lever or such lever can be utilized to actuate or service the transmission. Furthermore, the actuating lever, such as the shifting lever 18 of the manual gear shifting means, cooperates with at least one sensor 19*b* which detects the intention to shift into a particular gear and/or the momentary gear of the transmission and transmits signals to the control unit. The sensor 19*a* is linked to the transmission and detects the actual gear and/or the intention to shift. A detection of the intention to shift with assistance from at least one of the two sensors 19*a*, 19*b* can be achieved in that the at least one sensor is a force sensor which detects the force being applied to the shifting lever 18. However, it is also possible to design the sensor 19*a* and/or 19*b* as a movement or position monitoring sensor so that the control unit can detect an intention to shift on the basis of time-dependent changes of the position denoting signal.

The control unit 13 is in signal transmitting communication with all of the sensors, at least at certain times, and evaluates the signals from the sensors and system input values in such a manner and wise that, in dependency upon the actual operating point, the control unit can transmit control- and regulating commands to the at least one actuator. The driving element 12, such as an electric motor, of the actuator 13*b* receives from the control unit 13—which controls the operation of the clutch 3—torque selecting signals in dependency upon the measured values and/or system input values and/or signals of the attached sensorics. To this end, a control program in the form of hard- and/or software is implemented in the control unit to evaluate the incoming signals and calculates or ascertains the output signals on the basis of comparisons and/or functions and/or characteristic fields.

In accordance with a preferred embodiment, the control unit 13 has implemented a torque determining unit, a gear position determining unit, a slip determining unit and/or an operating condition determining unit, or it is in signal transmitting communication with at least one of these determining units. Such determining units can be implemented with control programs as hardware and/or software so that, with assistance from incoming sensor signals, it is possible to ascertain the torque of the driving unit 2 of the motor vehicle 1, the momentary gear of the transmission 4 as well as the slip prevailing in the region of the torque transmitting system 3 and the actual operating condition of the vehicle. The actually selected gear is ascertained by the gear position determining unit on the basis of signals from the sensors 19*a* and 19*b*. These sensors can be linked to the shifting lever 18 and/or to gear selecting and shifting means in the interior of the transmission, such as for example a central shifting shaft or rod, for example, to detect the positions and/or the speeds of such parts. Furthermore, it is possible to provide a load lever sensor 31 at a load lever 30, such as a gas pedal, to detect the position of the load lever. A further sensor 32 can serve as an idling sensor, i.e., this idling sensor 32 is on when the gas pedal, such as the load lever, is being actuated but is turned off when the gas pedal is not actuated so that such digital information renders it possible to recognize whether or not the load lever, such as gas pedal, is being actuated. The load lever sensor 31 detects the extent of actuation of the load lever.

In addition to the gas pedal 30, such as a load lever, and the sensors which are connected thereto, FIG. 1 further shows a brake applying or actuating element 40 for actuation or application of the vehicle brake or parking brake, such as a brake pedal, a manually operated braking lever or the hand- or foot-operated part of parking brake. At least one sensor 41 is provided at the actuating element 40 to monitor the application of the brake. For example, the sensor 41 can constitute a digital sensor such as a switch which serves to detect whether or not the brake applying element has been or is being actuated. This sensor can be in signal transmitting communication with a signal arrangement, such as a brake light which can indicate that the brake is on. This can be used in conjunction with the vehicle brake as well as with the parking brake. However, it is also possible to design the sensor 41 as an analog sensor; such analog sensor, e.g., a potentiometer, can ascertain the degree or extent of actuation of the brake applying element. Such an analog sensor can be also in signal transmitting association with a signal generating device.

Figure 2:
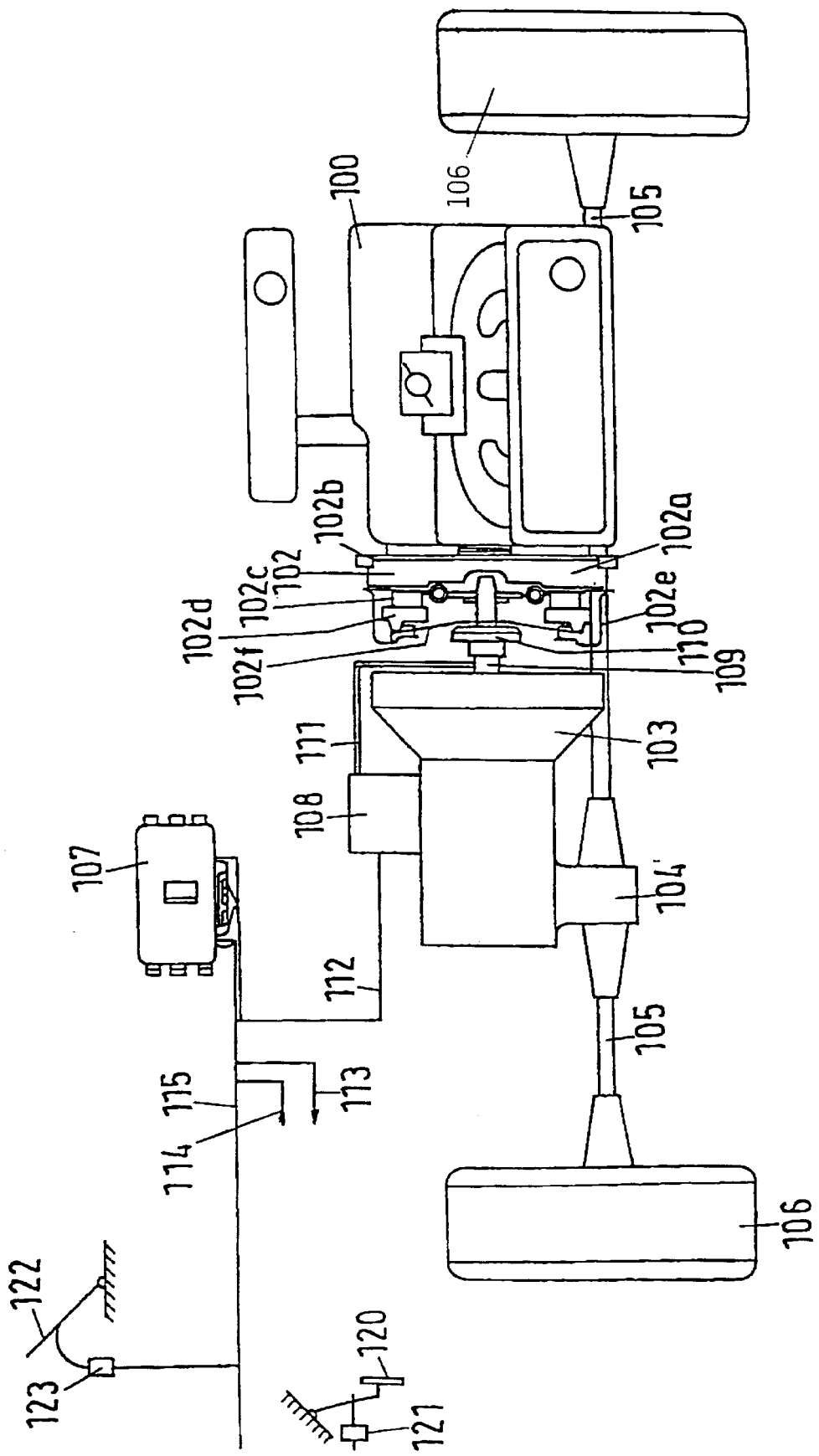

FIG. 2 shows schematically a power train of a motor vehicle with a driving unit 100, a torque transmitting system 102, a transission 103, a differential 104 as well as driven axles 105 and wheels 106. The torque transmitting system 102 is disposed and secured on or at a flywheel 102*a*, and this flywheel normally carries a starter gear 102*a*. The torque transmitting system comprises a pressure plate 102*d*, a clutch cover 102*e*, a diaphragm spring 102*f* and a clutch disc 102*c* with friction linings. If necessary, the clutch disc 102*c* can be provided with a damper arrangement between the clutch disc 102*d* and the flywheel 102*a*. An energy storing element, such as the diaphragm spring 102*f*, biases the pressure plate 102*d* in the axial direction toward the clutch disc 102*c*, and there is further provided a disengaging element 109, such as for example a cetral disengaging element which is operated by pressurised fluid and is provided to actuate the torque transmitting system. A disengaging bearing 110 is installed between the central disengaging element 109 and the tongues of the diaphragm spring 102*f*. The diaphragm spring is stressed in response to axial displacement of the disengaging bearing and disengages the clutch. Furthermore, the clutch can constitute a push-type or a pull-type clutch.

The actuator 108 is an actuator of the automated gear shifting transmission and this actuator further comprises the actuating unit for the torque transmitting system 102. The actor 108 actuates shifting elements in the case of the transmission, such as, for example, a shifting roller or shifting rods or a central shifting shaft of the transmission 103, and the actuation can be such that the gears are shitted into or disengaged from for example in a certain sequence or at random. The clutch actuating element 109 is operated by way of a connection 111. The control unit 107 is connected with the actuator 108 by way of a signal transmitting connection 112, and the control unit is further connected with signal transmitting connections or conductors 113 to 115. The conductor 114 processes the incoming signals, the conductor 113 processes control signals from the control unit, and the conductor 115 establishes, for example, a connection to other electronic units by means of a data bus.

In order to set the vehicle in motion or to start the vehicle essentially from stillstand or from a slow rolling movement, such as a creeping or crawling movement, namely to achieve a planned operator-induced acceleration of the vehicle, the operator basically actuates only the gas pedal, such as the load lever 30, whereby the automated actuation of the clutch by way of the actuator regulates the torque which can be transmitted by the torque transmitting system in the course of a vehicle starting operation. In response to actuation of the load lever, the load lever sensor 31 detects the operator's intention to effect a more or less pronounced or rapid vehicle starting operation and such operation is thereupon regulated by the control unit accordingly. The gas pedal and signals from the sensors associated with the gas pedal are utilized as input values to regulate the starting operation of the motor vehicle.

In the course of a starting operation, the torque, such as clutch torque $M_{ksoll}$, which can be transmitted during starting is determined basically by means of a preselectable function or on the basis of characteristic curves or characteristic fields in dependency upon the engine RPM, and the dependency upon the engine RPM or upon other parameters, such as the engine torque, is advantageously realised with a characteristic field or a characteristic curve.

If, in the course of a starting operation, basically from stillstand or from a creeping condition and at a low speed, the load lever resp. the gas pedal is actuated to a predetermined value a, an engine control 40' selects an engine torque. The control unit 13 of the automated clutch actuating means regulates the torque which can be transmitted by the torque transmitting system 2 in accordance with preselectable functions or characteristic fields so as to establish a stationary condition of equilibrium between the selected engine torque and the clutch torque. The state of equilibrium characterises itself in dependency upon the position a of the load lever by a certain starting RPM, a starting- or engine torque as well as a definite transmissible torque of the torque transmitting system and a torque which is transmissible to the driven wheels, such as for example a driving torque. Hereinafter, the functional relationship of starting torque as a function of the starting RPM will be referred to as characteristic starting curve. The load lever position a is proportional to the position of the throttle valve of the engine.

In addition to the gas pedal 122, such as a load lever, and a sensor 123 which is associated therewith, FIG. 2 shows a brake actuating or operating element 120, such as a brake pedal, manually operable braking lever or hand- or foot-operated actuating element of the parking brake, for actuation of the vehicle brake or parking brake. At least one sensor 121 is disposed at the actuating element 120 and monitors its actuation. For example, the sensor 121 can constitute a digital sensor, such as a switch, and this sensor serves to ascertain whether or not the actuating element 120 has been actuated. This sensor can be in a signal transmitting communication with a signal generating device, such as a brake lamp which indicates when the brake is applied. This can take place in conjunction with the vehicle brake as well as with the parking brake. However, the sensor 121 can also be designed to constitute an analog sensor, such as for example a potentiometer, and such sensor can determine the extent of application of the actuating element. This sensor, too, can be in signal transmitting communication with a signal generating device.

Figure 3A:
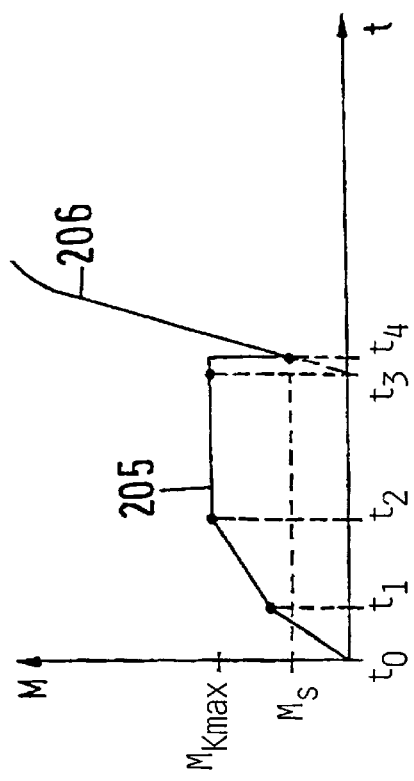

FIG. 3a shows a diagram wherein the calculated creeping torque $M_{KRIECH}$ 201 is represented as a function of time t. At the instant $t_0$, the creeping torque 205 begins to rise to the instant $t_2$ but with a different slope from the instant $t_1$ on. The calculated creeping torque 201 is essentially constant after the instant $t_2$. At the instant $t_3$, there is introduced by means of the gas pedal the vehicle operator's desire to start the vehicle, and this actuation of the gas pedal, such as a load lever, determines the starting torque 202 as a function of time; such torque is also shown in FIG. 3a. The curve 202 of the starting torque $M_{ANFAHR}$ has a very pronounced upward slope as the time progresses. The starting torque 202 exceeds the creeping torque 201 at the instant $t_4$.

For example, the start of determination of creeping torque at the instant $t_0$ can be effected by terminating the application of a brake, and the onset of a determination of the starting torque 202 at the instant $t_3$ can be initiated by actuating the gas pedal. In accordance with an inventive concept, the application of transmissible clutch torque $M_{Ksoll}$ from the instant $t_0$ to the instant $t_4$ is in accordance with the creeping torque 201, and in accordance with the starting torque 202 subsequent to the instant $t_4$. This ensures that a progressively increasing clutch torque is being initially selected during those stages when the vehicle starts and proceeds to creep, and, starting from a certain instant—such as for example $t_2$—there is selected a constant creeping torque to thus ensure that the application of creeping torque merely entails a slow movement of the vehicle. If the gas pedal is actuated at the instant $t_3$, the thus selected clutch torque initially matches the creeping torque in spite of actuation of the gas pedal until the starting torque 202 which began to develop at the instant $t_3$ begins to exceed the creeping torque at the instant $t_4$. The selected clutch torque shifts from a creeping progress to a starting progress at the intersection point where the creeping torque 201 and the starting torque 202 cross each other. The solid lines denote the progresses of curves of the selected clutch torque, and the broken lines correspond to the progresses of those curves which were not selected, i.e., which do not correspond to the actual progress of clutch torque.

Figure 3C:
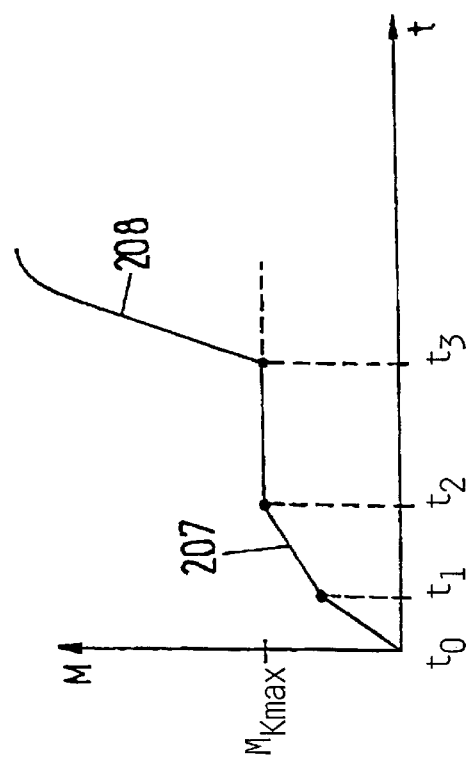
Figure 3B:
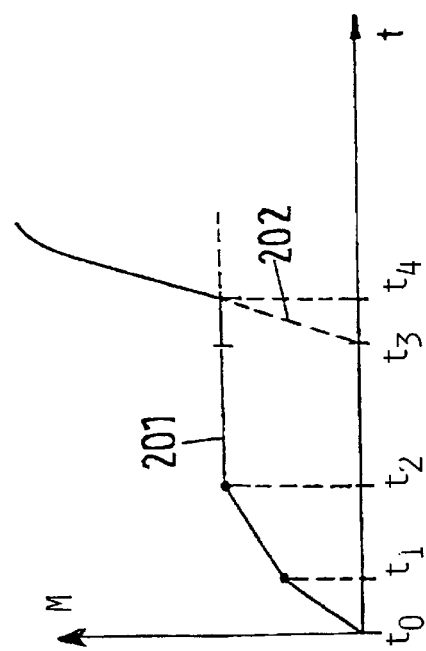

FIG. 3b shows the creeping torque 203 as well as the starting torque 204 as a function of time t. Starting at the instant $t_0$, the creeping torque is built up in two phases and the clutch torque is selected accordingly. During the phase or interval between $t_0$ and $t_1$, the slope of the rise of selected creeping torque is more pronounced than between the instants $t_1$ and $t_2$. From the instant $t_2$ on, and up to the instant $t_3$, the creeping torque is essentially constant. At the instant $t_3$, there takes place an actuation of the gas pedal by the operator so that the creeping operation is interrupted and a starting operation begins. The selected clutch torque jumps from the curve 203, denoting the creeping torque, to the curve 204 which denotes the starting torque. Thus, starting at the instant $t_3$, the creeping torque 203 is no longer utilised to select and determine the clutch torque.

FIG. 3c shows a modification of the operations represented in FIGS. 3a and 3b in that the creeping torque 205 as well as the starting torque 206 are represented as a function of time t. The creeping torque 205 rises during the interval from $t_0$ to $t_1$ as well as during the interval from $t_1$ to $t_2$, the rise of the creeping torque during the interval from $t_0$ to $t_1$ being more pronounced than during the interval between $t_1$ and $t_2$. The maximum creeping torque $M_{Kmax}$ is reached at the instant $t_2$, and the creeping torque thereupon remains at such value. A gas pedal actuation or the actuation of the throttle valve takes place at the instant $t_3$ so that, from the instant $t_3$ on, the control unit determines and generates the starting function 206. The function 206 rises from the instant $t_3$ on. The starting function exceeds a threshold value $M_s$ at the instant $t_4$ and, at this instant $t_4$, the selected clutch torque shifts from the creeping torque 205 to the starting torque 206. Prior to the instant $t_4$, the clutch torque is determined by the creeping torque 205 but, from the instant $t_4$ on, the clutch torque is determined by the starting torque 206 as a consequence of actuation of the gas pedal and the reaching of the threshold value.

Figure 3D:
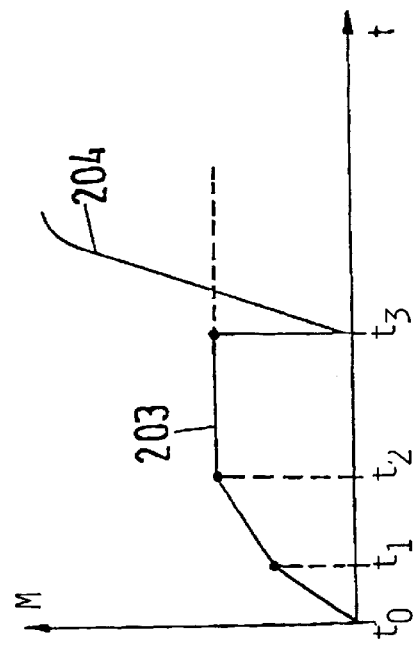

In FIG. 3d, the torque is represented as a function of time. The curve 207 represents the creeping torque, and the curve 208 denotes the starting torque as determined by the control unit. The application of a brake is terminated at the instant $t_0$ and the creeping torque 207 rises to a maximum value $M_{Kmax}$ during the interval between $t_0$ and $t_2$. The creeping torque remains at the maximum value during the interval between $t_2$ and $t_3$, and the operator actuates the gas pedal at the instant $t_3$. From the instant $t_3$ on, there is generated the starting torque 208 and is added to the existing creeping torque.

Figure 4:
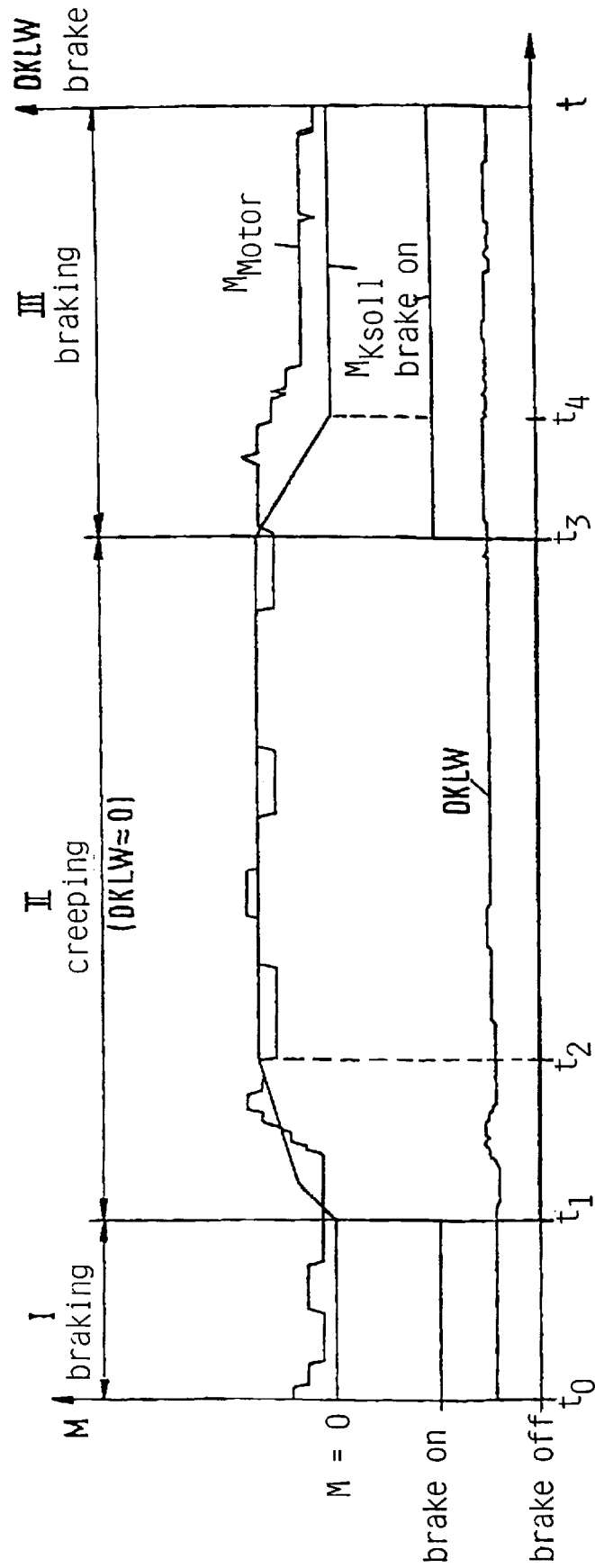

FIG. 4 shows a diagram with representations of the clutch torque $M_{Ksoll}$ and engine torque $M_{Motor}$ as well as a signal denoting a brake application or actuation and a signal denoting the angle DKLW, all as a function of time t. The brake is applied and the gas pedal is not depressed during the interval between the instant $t_0$ and the instant $t_1$ so that, basically, the engine torque $M_{Motor}$ assumes its minimal value and the clutch torque $M_{Ksoll}$ equals zero or is essentially zero. Under such circumstances, the vehicle is basically at a standstill.

During the interval I von $t_0$ to $t_1$, the vehicle assumes a condition "braking" while the gas pedal is not depressed. The application of the brake is terminated at the instant $t_1$ whereby the brake signal is lowered from "brake on" to "brake off". Since the gas pedal is not actuated at such time, i.e., since the throttle valve angle is essentially at a lowermost value, the control unit selects the clutch torque $M_{Ksoll}$ to initiate a creeping operation, namely the clutch torque $M_{Ksoll}$ begins to rise at $t_1$ and reaches its maximum value at the instant $t_2$. Due to an equilibrium of torques at the engine, the idling operation regulator of the engine electronics controls the engine RPM, respectively the engine torque $M_{Motor}$ which rises during the interval from $t_1$ to $t_2$ in order to react in an equalizing manner upon the increased clutch torque $M_{Ksoll}$. Fluctuations of engine torque which can be seen in FIG. 4 are the consequence of digitalization of the available signal and of fluctuations which can be within the boundary of the resolution limit. However, the rise in the interval between $t_1$ and $t_2$ is significant and is a consequence of an increase of engine torque under the action of the idling regulator. The time interval II from $t_1$ to $t_3$ is a period of time during which the vehicle assumes the condition "creeping" while the throttle valve angle is minimal, essentially zero. A brake is actuated at the instant $t_3$ so that the brake signal rises from the value "brake off" to "brake on" and, therefore, at the instant $t_3$ the control unit selects the clutch torque in such a way that the clutch torque drops to zero during the interval III from the instant $t_3$ to the instant $t_4$. Due to time delay which is attributable to idling RPM regulator, the engine torque is initially reduced with a certain time delay so that, from the instant $t_4$ on, the clutch torque $M_{Ksoll}$ remains essentially at zero.

The rise of clutch torque $M_{Ksoll}$ takes place on the basis of the calculated creeping torque which is ascertained on the basis of a predetermined process or a preselected function. The embodiment of FIG. 4 illustrates a rise of the creep torque respectively of the thus selected clutch torque $M_{Ksoll}$ in two stages, namely during a first stage at a higher velocity of change and during a second stage at a lesser speed of variation. The transition from the high variation speed to the low variation speed takes place when the clutch torque reaches a preselectable value. For example, such preselectable value can be ascertained on the basis of an adaptation of the engagement point.

In this embodiment of FIG. 4, the lowering of the creeping torque respectively of the thus selected clutch torque, takes place due to a linear lowering based on the carrying out of the brake actuating operation, and this can also entail a multi-stage lowering in several phases, and the various phases can involve a lowering of the torque at different variation speeds.

Figure 5:
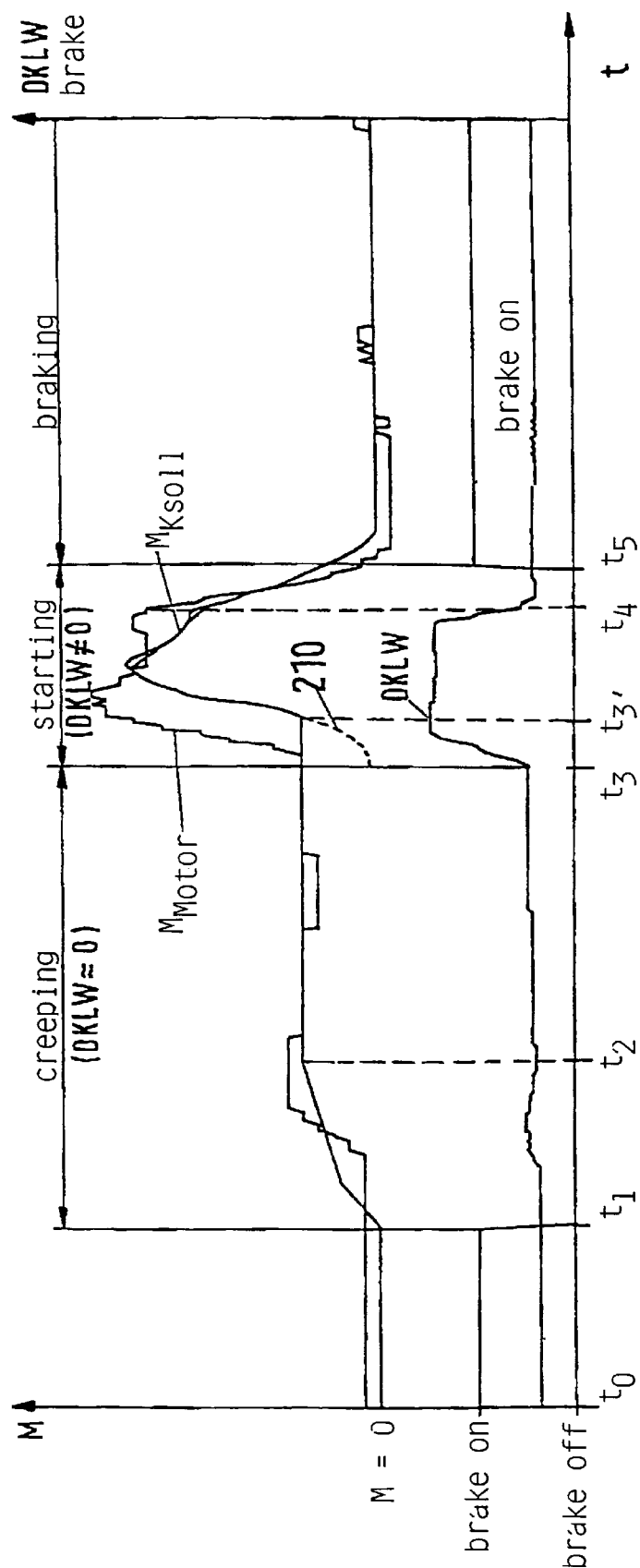

In a manner corresponding to that shown in FIG. 4, FIG. 5 shows the torque values $M_{Ksoll}$ of the clutch torque and $M_{Motor}$ of the engine torque as well as those of the throttle valve angle DKLW and a brake signal brake as a function of time. A braking operation is being carried out during the interval from $t_0$ to $t_1$, i.e., the brake signal is set to "brake on". At the same time, the gas pedal is not actuated and the throttle valve angle DKLW is minimal or essentially zero. This entails a reduction of the clutch torque $M_{Ksoll}$ to zero; this is effected by the control unit and, at the same time, the idling RPM regulator of the engine sets the engine torque to a minimum value. The application of the brake is terminated at the instant $t_1$ which results in the introduction of the condition "creeping". The load lever is not actuated, i.e., DKLW approximates zero and the control unit causes the application of an at least slight clutch torque in accordance with the function of creeping torque so that the vehicle begins to roll at least at a minimal speed. Due to selection of a clutch torque, the idling RPM regulator of the engine electronics raises the engine torque in order to equalize the load by the introduced minimal clutch torque. At the instant $t_2$, the creeping torque, i.e., the clutch torque, rises to a maximum value so that there is started a stationary condition which persists to the instant $t_3$. At the instant $t_3$, the operator carries out an actuation of the gas pedal which causes the throttle valve angle DKLW to depart from zero, namely to increase. Consequently, the control unit of the engine electronics raises the engine torque and the engine RPM so that the operation no longer takes place in the idling range. The control unit of the novel apparatus calculates the starting torque, for example, in dependency on the engine RPM or in dependency upon the engine torque, so that the clutch torque $M_{Ksoll}$ is selected in dependency upon the calculated starting characteristic curve resp. in dependency upon the starting torque. FIG. 5 shows the starting torque 210 as it was calculated from the instant $t_3$ on, for example, in dependency upon the engine RPM. The clutch torque $M_{Ksoll}$ is set in dependency upon the starting torque only from the instant $t_{3'}$ on, i.e., it is still selected in dependency upon the creeping torque during the interval between $t_3$ and $t_{3'}$. The actuation of the throttle valve, such as the gas pedal, is terminated at the instant $t_4$ so that, from the instant $t_4$ on, the engine RPM and the engine torque are lowered by the engine controls and, at the same time, there is calculated a starting operation terminating function which effects a reduction of the desired clutch torque. An actuation of the brake takes place from the instant $t_5$ on, and this entails the establishment of a braking function which, in turn, reduces the selected clutch torque to zero. For example, the starting operation terminating function for selection of clutch torque can be selected on the basis of a function of time or, for example, as a function of the engine RPM or also as a function of engine torque. It is often of advantage to select the braking function for determination of the selected clutch torque as a function of time because this renders it possible to achieve a much speedier selection of the desired reduced clutch torque. The brake remains actuated from the instant $t_5$ on so that the throttle valve angle assumes essentially its minimum value; furthermore, the selected clutch torque as well as the selected engine torque also assume essentially their minimal values. In this region, the engine torque is initially even negative which is caused by the drag torque when the vehicle is coasting.

Figure 6:
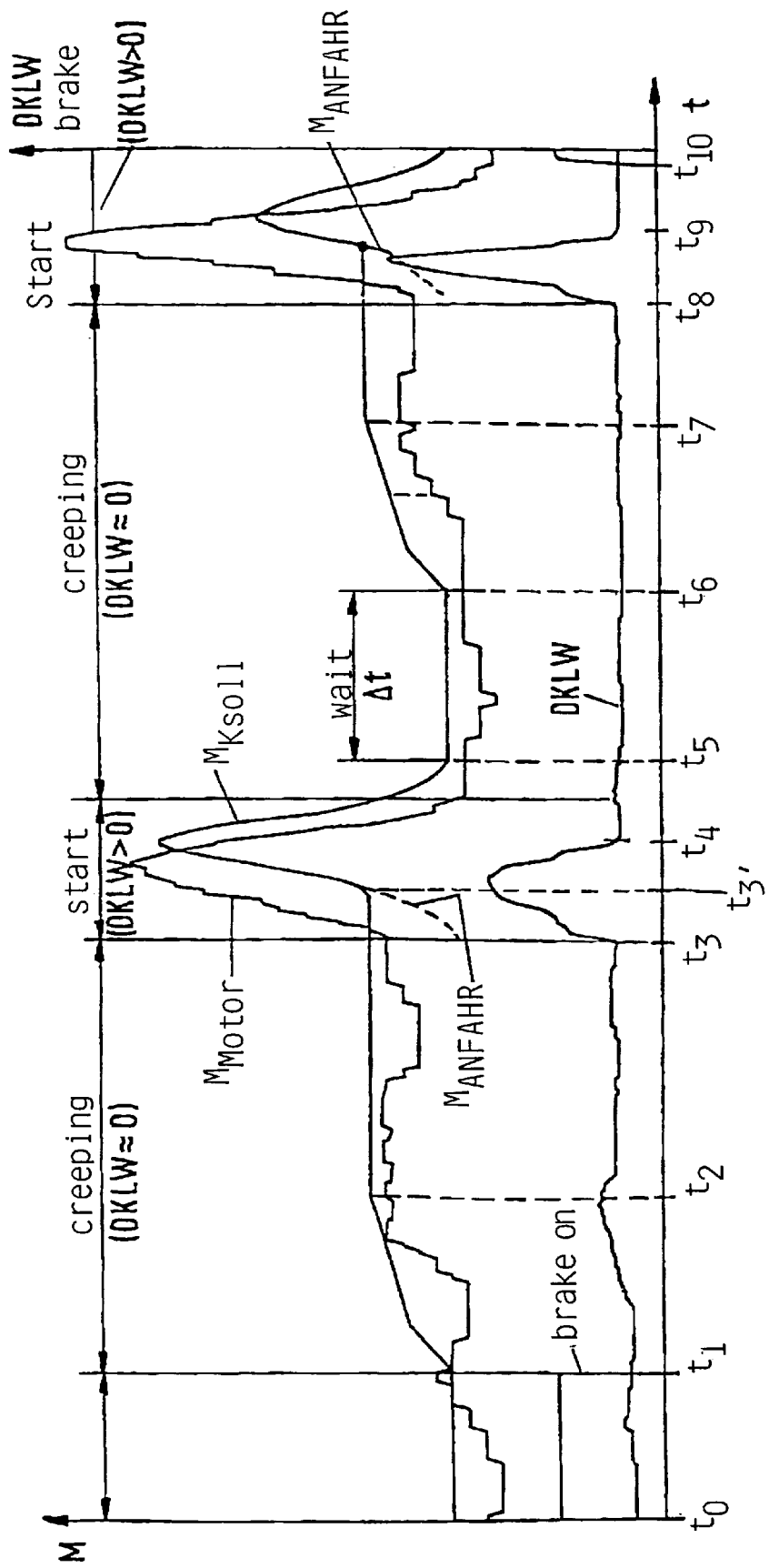

FIG. 6 shows a diagram with the engine torque, the desired clutch torque and the brake signal as well as the throttle valve angle DKLW represented as a function of time. The actuation of a brake takes place from the instant $t_0$ to the instant $t_1$ so that the selected clutch torque is essentially zero. The application of the brake is terminated at the instant $t_1$ which causes the control unit to initiate a creeping movement of the vehicle. This is effected in such a way that the creeping torque is calculated, for example with a function generator, as a function of time and the clutch torque $M_{Ksoll}$ is selected in accordance with such creeping torque. The operator actuates the gas pedal at the instant $t_3$ which causes the engine controls to set the throttle valve angle DKLW. This entails a rise of the engine RPM and of the engine torque which, in turn, results in a determination of the starting torque $M_{ANFAHR}$ from the instant $t_3$ on. The desired clutch torque is calculated in accordance with the starting torque when a comparison indicates that the starting torque exceeds the creeping torque. Crossing of the starting torque in comparison with the creeping torque takes place at the instant $t_{3'}$. The actuation of the load lever or gas pedal is terminated at the instant $t_4$ which entails a corresponding reduction of desired clutch torque in accordance with a starting operation terminating function, for example, as a function of the engine RPM or of the engine torque. Upon completed lowering of the clutch torque in accordance with a starting operation terminating function, the clutch torque drops to zero at the instant $t_5$, and this is followed by a waiting period $\Delta t$ from $t_5$ to $t_6$ while the desired clutch torque is held to a value of at least close to zero. From the instant $t_6$, namely after elapse of the period $\Delta t$, the vehicle again begins to crawl because the crawling torque is being determined again from the instant $t_6$ and the desired clutch torque is determined by the creeping torque. The creeping torque reaches its maximum value at the instant $t_7$. The throttle valve is actuated again at the instant $t_8$, i.e., the gas pedal is depressed, and such actuation is terminated at the instant $t_9$. A brake is actuated at the instant $t_{10}$. When the throttle valve angle increases, as indicated at the instants $t_3$ and $t_8$, this always entails a rise of engine torque under the action of engine controls and, as a consequence, a rise of starting torque as a function of engine RPM or the engine torque. When the starting torque crosses the creeping torque, the determination of the desired clutch torque begins in accordance with the starting torque but the desired clutch torque is determined in accordance with the creeping torque when the starting torque drops below the creeping torque.

Figure 7:
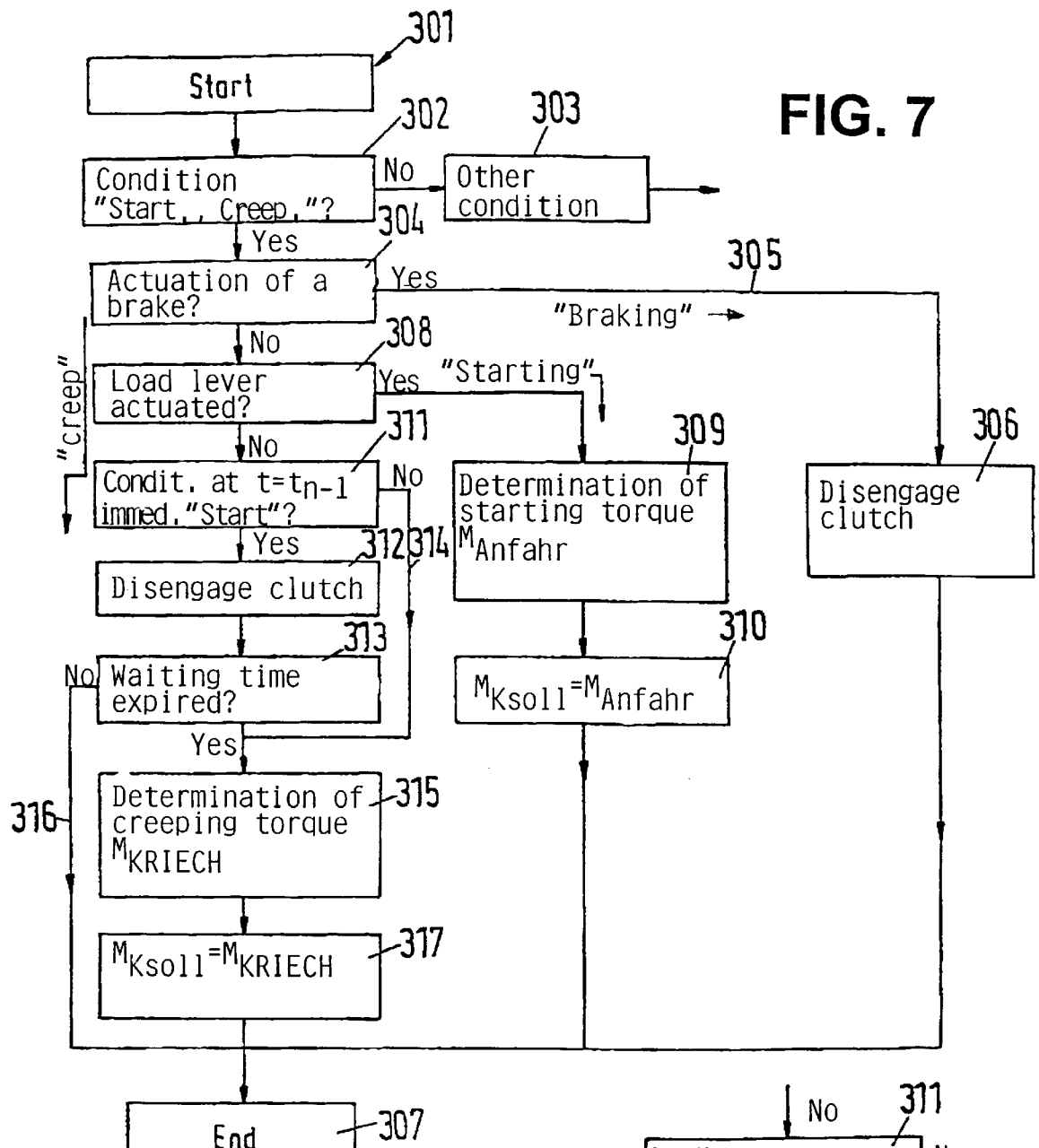

FIG. 7 illustrates a block diagram representing the mode of operation of an apparatus according to the invention. The process begins at 301 and, if and when necessary, the process is resorted to on the basis of addressed events or periodically or aperiodically as a function of time. The block 302 denotes a determination of the driving condition, namely whether the operating condition is the condition "starting, creeping". For example, in such condition the controlling of the clutch for the purpose of creeping or starting of the vehicle is undertaken or interrupted depending upon whether the operator has carried out a brake actuating operation.

If the inquiry at 302 is answered in the negative, there exists a different situation which is indicated at 303. For example, such situation can involve a gear shifting operation or a driving of the vehicle. Depending upon the categories of such conditions, the control unit switches between the corresponding operating procedures.

If the inquiry in the block 302 is answered in the affirmative, this indicates the condition "starting, creeping". The block 304 denotes the inquiry to ascertain whether or not one of the available brakes, such as for example the vehicle- or parking brake, is being actuated. If one of these brakes is being actuated, and as indicated by the path 305 leading to the block 306, the torque which can be transmitted by the torque transmitting system, such as a clutch torque, is regulated by the control unit in such a way that the system is disengaged. The routine is then terminated as indicated by the block 307. The manner in which the clutch is being operated to become disengaged will be described in greater detail hereinafter.

If the inquiry at the block 304 is answered in the negative, namely that none of the brakes are being actuated, an inquiry is made (note the block 308) whether the load lever, such as a gas pedal, is being actuated. If this is the case, the next step involves a calculation or determination of the starting torque $M_{ANFAHR}$ (note the block 309), and the desired clutch torque is set and regulated to match the starting torque (block 310). The starting procedure is terminated at the block 307.

If the inquiry at 308, namely whether or not the load lever is being actuated, is answered in the negative, namely that the gas pedal is not actuated, inquiry is made at the block 311 to ascertain whether the condition at the instant $t=t_{n-1}$ is that of a starting condition. The purpose of such inquiry is to ascertain whether, in the course of the preceding step, such as an interval of time, the condition was a starting condition but has been followed by a nonstarting condition, namely a creeping condition, at which the gas pedal is not actuated. In other words, an inquiry is made whether during the preceding interval of time the condition was a starting condition and now, during the immediately following existing interval the condition is a creeping condition which means that an actuation of the load lever did take place during the transition from the preceding condition to the actually prevailing condition. If this is the case, the clutch is disengaged in a step which is denoted by the block 312, and the block 313 denotes a waiting time until the preselectable interval of time has elapsed. If the inquiry denoted by the block 311 is answered in the negative, this indicates that the load lever was not actuated at least in the course of two intervals and the operation proceeds along the path 314 to the block 315. If the period of waiting denoted by the block 313 has expired, one again proceeds to the block 315. If the period of waiting is still running, one proceeds along the path 316 to terminate the routine at 307.

The block 315 denotes the determination of the creeping torque $M_{KRIECH}$. In the next step, as denoted by the block 317, the clutch torque—such as the regulated clutch torque—is set to match the creeping torque $M_{KRIECH}$ before the routine is terminated as indicated by the block 307.

The determination of creeping torque as denoted by the block 315 as well as the determination of the starting torque as indicated by the block 309 will be described in detail hereinafter. Disengagement of the clutch as indicated by the block 312, too, will be described hereinafter.

For example, the method according to FIG. 7 corresponds to a method according to FIG. 6 wherein a waiting period during the interval between $t_5$ and $t_6$ is initiated and expires upon completion of a starting operation prior to initiation of an immediately following renewed creeping movement of the vehicle.

Figure 7A:
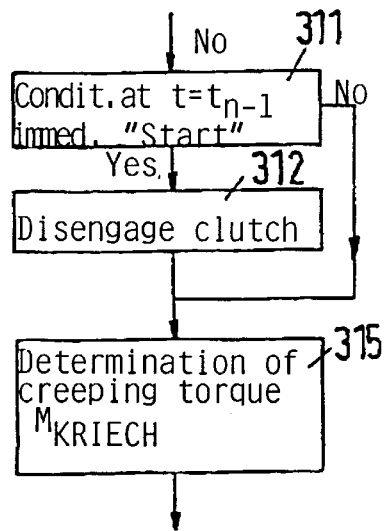

FIG. 7a illustrates a detail of FIG. 7 according to which an inquiry is made at the block 311 whether, in comparison with the preceding interval of time, the prevailing condition is a starting condition. If this is the case, the clutch is disengaged as indicated by the block 312 and the creeping torque is calculated as indicated by the block 315. Thus, the procedure denoted by FIG. 7a dispenses with the inquiry concerning a waiting period so that a reduction or lowering of torque which can be transmitted by the torque transmitting system can be followed by a determination of the creeping torque as indicated by the block 315. Thus, the step denoted in FIG. 7 by the block 313 is omitted in the routine which is illustrated in FIG. 7.

Figure 8:
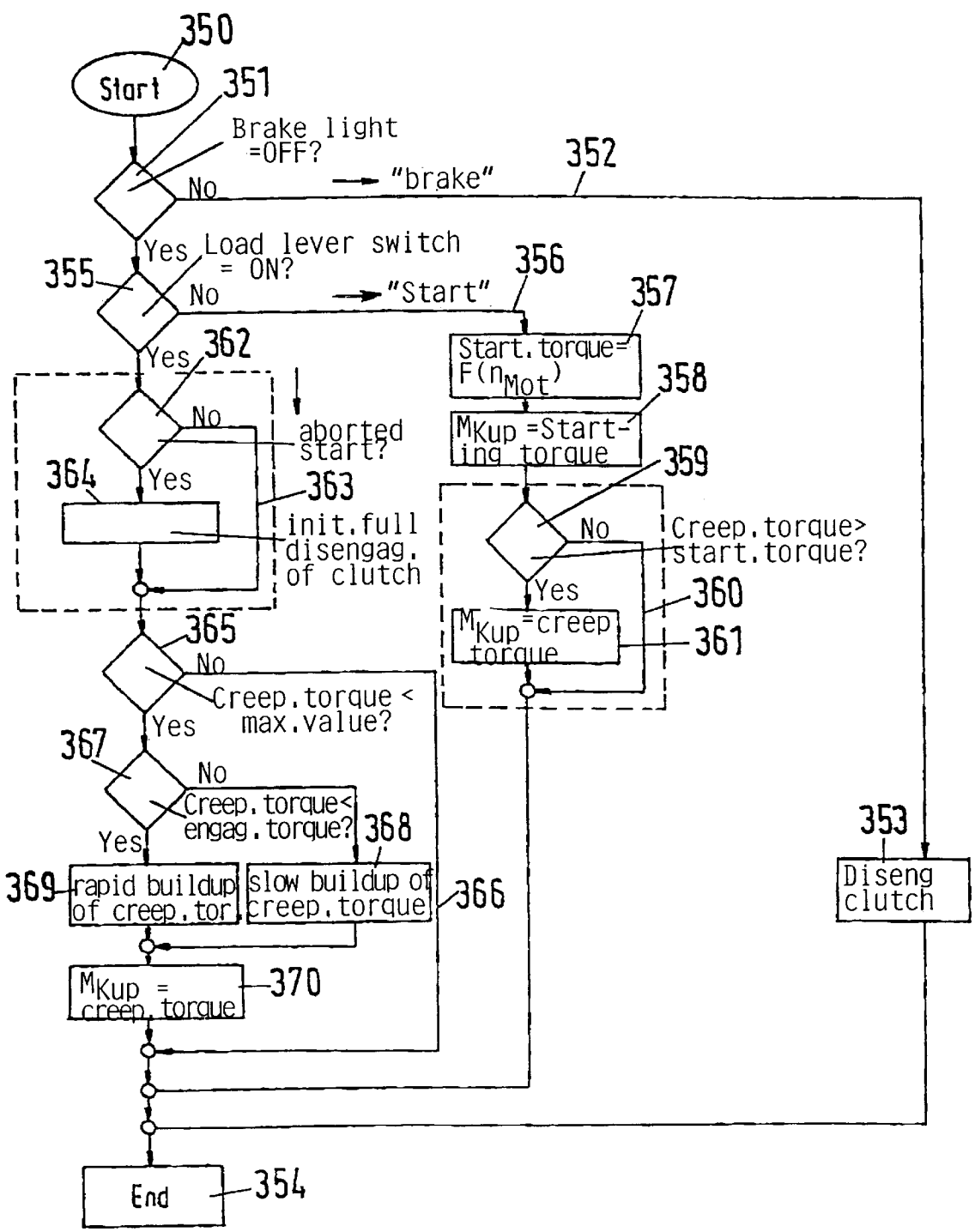

FIG. 8 illustrates another modification of that embodiment of the method which is shown in FIG. 7. The routine is started at 350, and 351 denotes an inquiry whether a brake light is off. Such inquiry as denoted by the block 351, namely whether the brake light is off, indicates whether the brake, such as for example a hand brake or a parking brake or a vehicle brake is actuated or not. If the inquiry denoted by the block 351 is answered in the negative, the clutch is disengaged as indicated by the path 352 and the block 353, and the routine is terminated thereafter, as at 354.

If the brake is not actuated, an inquiry is made (note the block 355) whether the idling switch (LL) is on. The idling switch is a switch which is actuated when the gas pedal is not actuated. Thus, an idling switch which is not turned on indicates that the idling operation is being actually regulated and, therefore, the operator did not indicate a desire to accelerate the vehicle. If the inquiry denoted by the block 355 is answered with "no", a starting operation is initiated along the path 356 leading to a block 357 denoting a determination of the starting torque, for example, as a function of the engine RPM F ($N_{MOT}$). The block 358 denotes the step of matching the adjustable clutch torque with the starting torque, and the block 359 denotes an inquiry to ascertain whether the actually calculated creeping torque exceeds the starting torque. If this is not the case, the procedure follows the path 360 and the routine is ended. However, if the creeping torque exceeds the starting torque, the creeping torque is selected as the clutch torque (block 361) and the routine is thereafter completed at 354.

If the idling switch at the block 355 of FIG. 8 is already on, i.e., the engine is idling, an inquiry is made at 362 to ascertain whether the actual condition is an interrupted starting condition, i.e., that in the course of the preceding step, such as a period of idling, there existed a starting condition but no starting condition exists at the time of inquiry at 362. If this is not the case, the method proceeds as indicated by the path 363; however, if the inquiry denoted by the block 362 is answered in the affirmative, the clutch is fully disengaged as indicated by the block 364. In the next step, and as indicated by the block 365, inquiry is made to ascertain whether the creeping torque is below a maximum value. If this is not the case, the procedure is terminated in a manner as indicated by the path 366 and block 354. However, if the inquiry denoted by the block 355 is answered in the affirmative, i.e., the creeping torque is less than the maxium value, an inquiry is made (note the block 367) whether the creeping torque is less than the engagement torque. If this is not the case, the creeping torque is gradually reduced as indicated by the block 368. If the inquiry denoted by the block 367 is answered in the affirmative, the creeping torque is rapidly increased (as indicated by the block 369) before the thus increased creeping torque is set as the clutch torque (note the block 370). The routine is thereupon terminated at 354.

Figure 9:
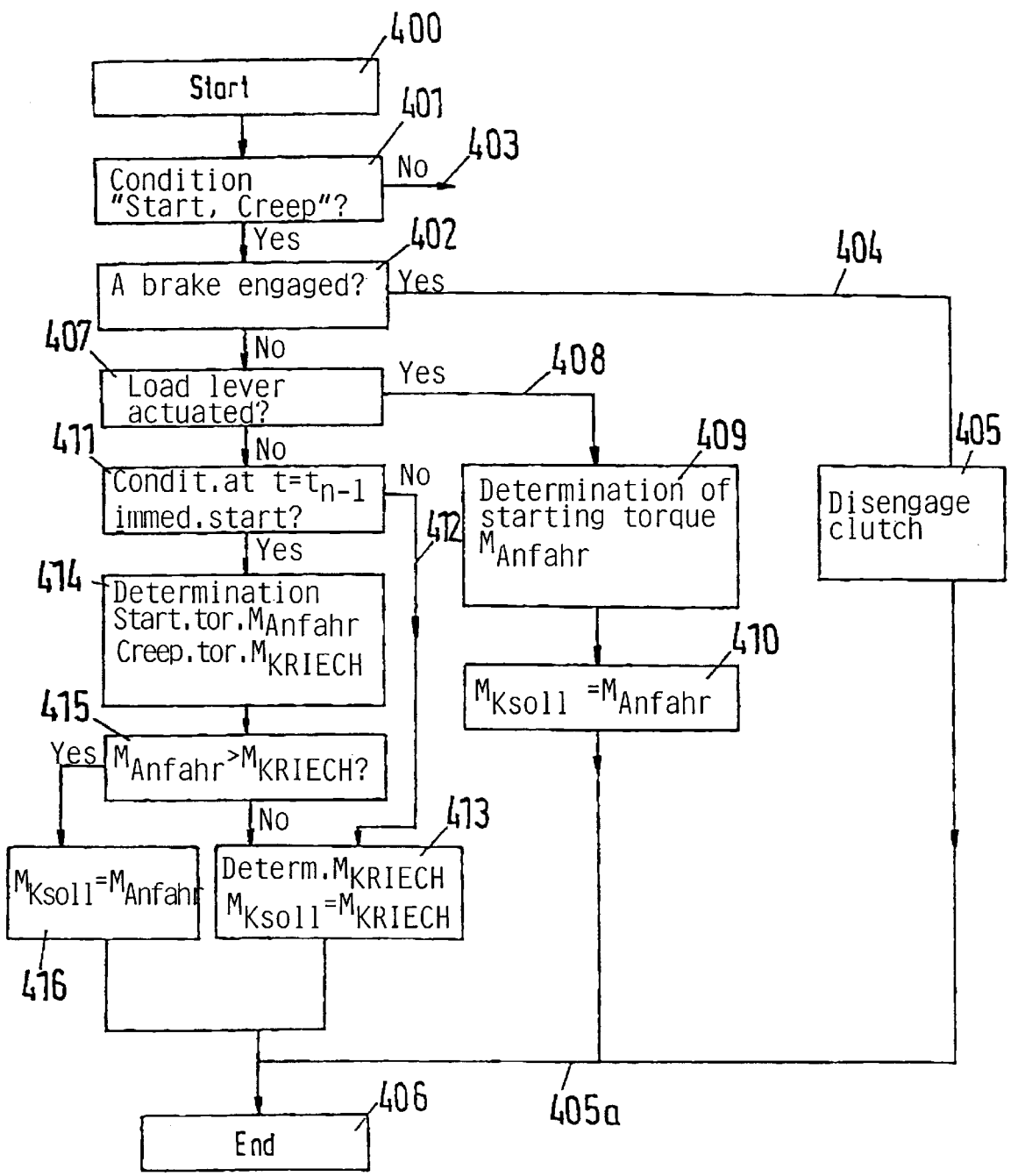

In accordance with the method the steps of which are illustrated in FIG. 9, the routine is started at 400, and the block 401 denotes an inquiry to ascertain whether the actual (then prevailing) condition is a starting or creeping condition. If the answer is in the affirmative, one proceeds as indicated by the block 402; if the answer is "no", the method follows the path 403 to shift to another procedure. The block 402 denotes an inquiry to ascertain whether or not a brake is being applied. If such is the case, the procedure follows the path 404, i.e., the clutch is disengaged at 405 and the procedure is terminated at 406 (via 405a) for the time being. The procedure is started at 400 at regular or irregular intervals, either as a function of time or in dependency upon occurrence of certain events.

If the inquiry denoted by the block 402 does not indicate that a brake is being applied, there follows an inquiry (as indicated by the block 407) to ascertain whether or not the load lever, such as a gas pedal, is being actuated. If such is the case, the routine follows the path 408 to the block 409 which denotes the determination of starting torque $M_{ANFAHR}$. The block 410 denotes the step of matching the clutch torque $M_{Ksoll}$ with the starting torque and the routine is terminated at 406.

If the inquiry denoted by the block 407 indicates that the load lever is not actuated, there follows an inquiry which is indicated by the block 411 and serves to ascertain whether or not a starting condition prevailed during the preceding interval namely at $t=t_{n-1}$. If this was not the case, the method proceeds as indicated by the path 412 and block 413, i.e., one determines the creeping torque $M_{KRIECH}$ and the desired clutch torque is caused to match the creeping torque before the method is terminated as indicated by the block 406. If the preceding condition (as indicated by the block 411) was a starting condition, there existed a change from a starting to a creeping condition so that the step denoted by the block 414 is resorted to in order to ascertain the starting torque $M_{Anfahr}$ the creeping torque $M_{KRIECH}$. The modes of determining the starting and creeping torques will be described in detail hereinafter. The block 415 denotes an inqury whether the starting torque exceeds the creeping torque. If such is the case, the step denoted by the block 416 is resorted to in order to match the desired clutch torque with the starting torque. However, if this is not the case, the method proceeds as indicated by the block 413, namely the desired clutch torque is caused to match the creeping torque. The routine is thereupon terminated as indicated by the block 406.

Figure 10:
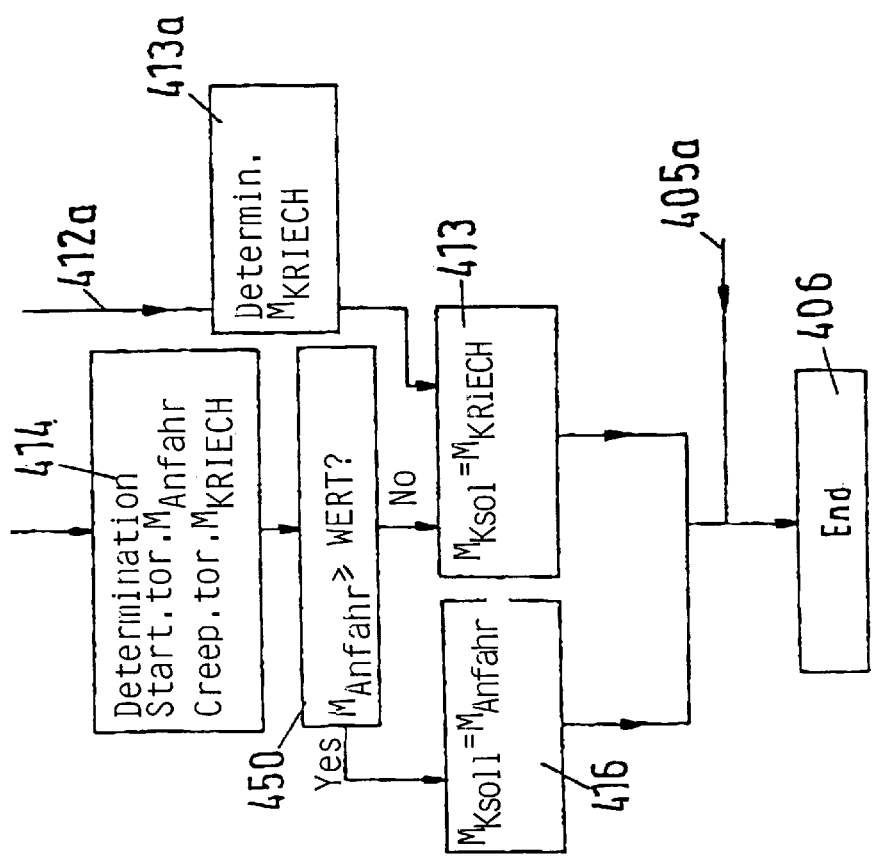

FIG. 10 illustrates an embodiment which constitutes a modification of the embodiment shown in FIG. 9. The block 414 denotes the determination of the starting- and creeping torques. The block 450 denotes an inquiry whether the starting torque $M_{Anfahr}$ is greater than or matches a preselected value WERT. If such is the case, the step denoted by the block 416 represents a matching of the clutch torque with the starting torque before the routine is terminated at the block 406. If the outcome of the inquiry denoted by the block 450 is negative, the step denoted by the block 413 involves a setting of the clutch torque in accordance with the creeping torque, namely the clutch torque is caused to match the creeping torque before the procedure is completed at 406. The connection 405a corresponds to the connection 405a of FIG. 9, and the connection 412a corresponds to the connection 412 of FIG. 9. The block 413a has been inserted in FIG. 10 to denote the determination of the creeping torque.

Figure 11:
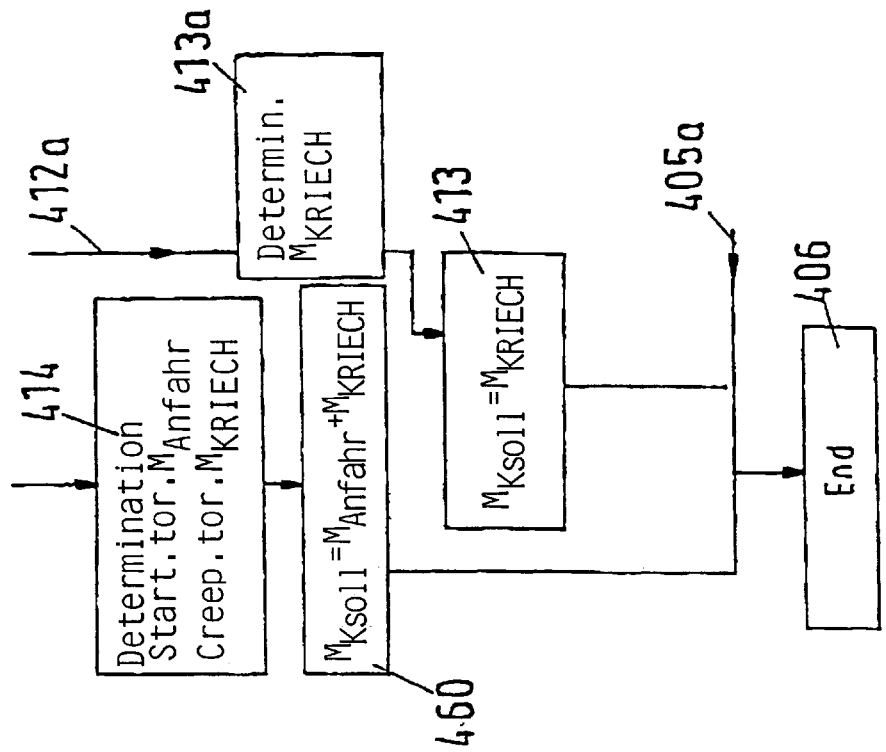

FIG. 11 also shows a modification of the embodiment of FIG. 9, the block 414 denoting the determination of the starting torque $M_{Anfahr}$ and of the creeping torque $M_{KRIECH}$. Block 460 denotes the matching of the clutch torque with the starting torque plus the creeping torque before the routine is terminated at 406. The connection 412a corresponds to the connection 412 in FIG. 9 and the block 413a denoting the determination of the creeping torque has been placed ahead of he block 413 which denotes the matching of the clutch torque with the creeping torque. The connection 405a corresponds to the connection 405a of FIG. 9.

In FIG. 9, the inquiry at 415 entails such selection of the clutch torque that, if the starting torque exceeds the creeping torque, the clutch torque is regulated in dependency upon the starting torque but otherwise in dependency upon the creeping torque.

In FIG. 10, the clutch torque is regulated only in accordance with the starting torque if the starting torque exceeds the preselected value; otherwise, the clutch torque is regulated in dependency upon the creeping torque. In contrast to the just outlined procedure, FIG. 11 shows a modification in which the clutch torque is selected as the sum of the starting- and creeping torques.

Figure 12:
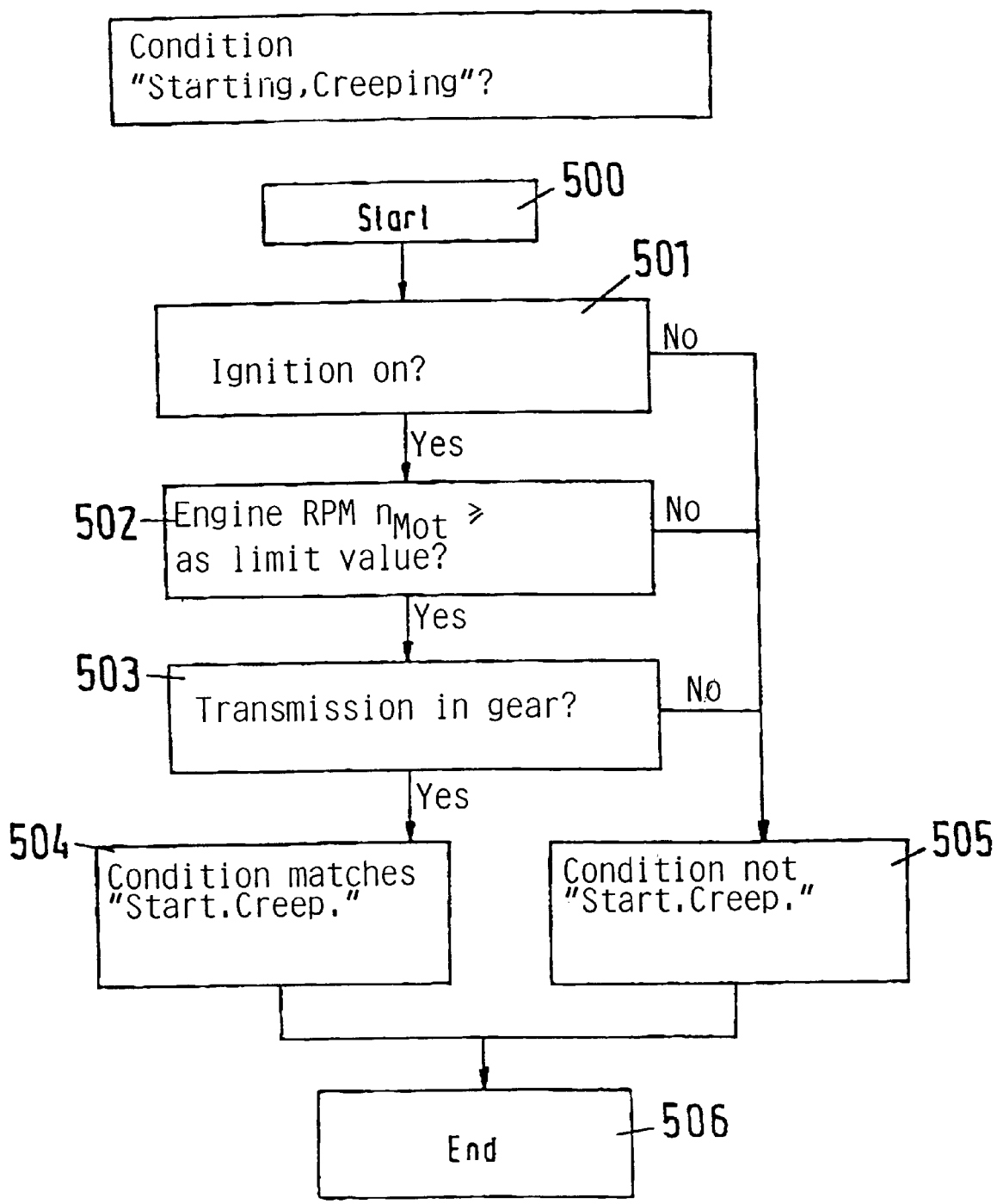

FIG. 12 illustrates the steps of a method of determining the condition "starting, creeping" such as is denoted, for example, by the block 302 or 403. The method begins at the block 500, and the block 501 denotes an inquiry whether the ignition system is on. If such is the case, the inquiry denoted by the block 502 involves a determination whether the engine RPM $N_{Mot}$ is higher than a limit value and, for example, such limit value can be essentially less than the idling RPM. If such is the case, the inquiry denoted by the block 503 involves a determination whether the transmission is in gear. If such is the case and if, for example, the transmission is in a starting gear or another gear, the step denoted by block 504 involves the presumption of recognition of a condition denoting "starting or creeping". If the inquiries at 501, 502 or 503 are answered in the negative, the block 505 does not indicate a condition "starting or creeping" and the routine is terminated at 506.

Additional conditions can be caused to follow the step denoted by the block 503 in order to recognize a condition "starting, creeping". For example, such conditions can point in a direction that a driver is recognized in the motor vehicle.

Figure 13A:
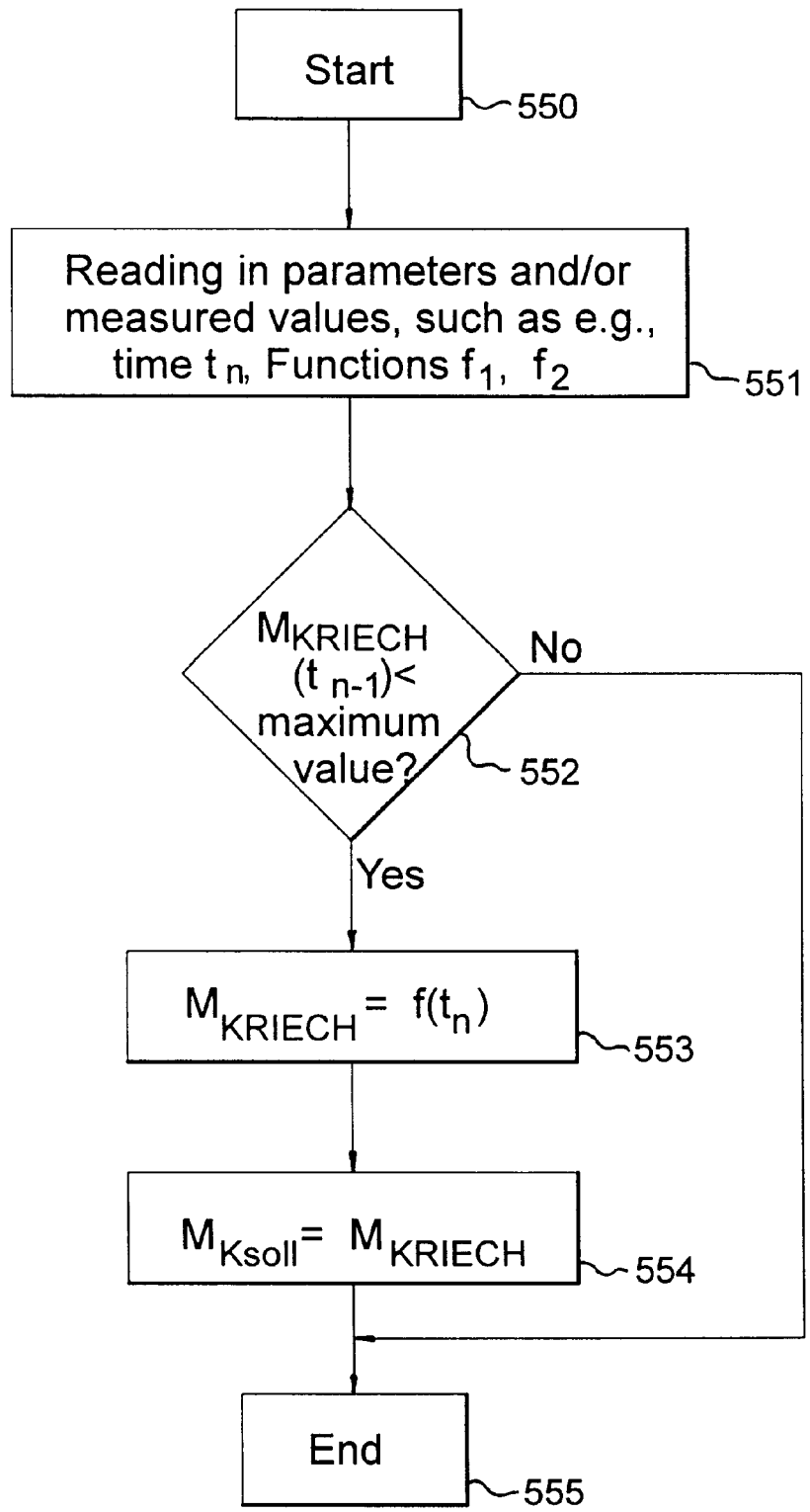

The blocks of the diagram of FIG. 13a denote a series of steps for the determination of the creeping torque. The block 550 denotes the start of the procedure, and the block 551 is representative of furnishing of all parameters and measured values which are necessary for the carrying out of the method, for example, time $t_n$ as well as functions $f_1$ and $f_2$ as well as characteristic fields or characteristic curves. The block 552 indicates the inquiry to determine whether the previously ascertained creeping torqe $M_{KRIECH}$ is smaller than a preselectable maximum value. If such is the case, the creeping torque at the relevant instant $t_n$ is ascertained as $M_{KRIECH}=f(t_n)$ see the block 553. The next block 554 denotes the step of matching the clutch torque to the creeping torque; such step is optional if other inquiries of the nature described in connection with the preceding Figures are carried out prior to a determination of the clutch torque. The block 555 indicates the end of the procedure. The calculation of creeping torque as denoted by the block 553 can be effected in dependency upon a mathematical function or by recovering values (information) from characteristic curves or characteristic fields. The function f, $f_1$ or $f_2$ can be a linear function or a square, exponential or other function according to which the creeping torque can be ascertained, for example, as a function of time t.

Figure 13B:
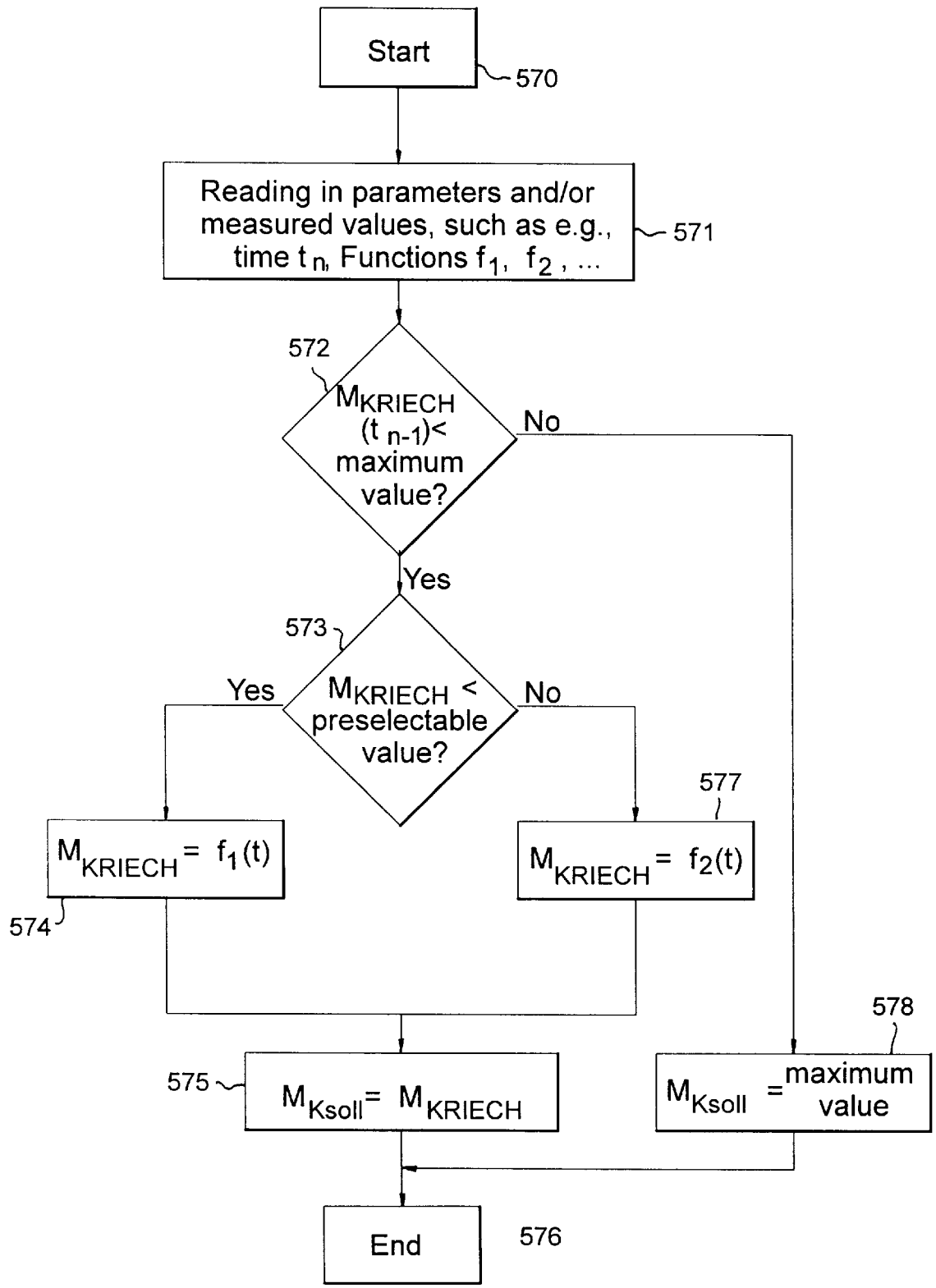

FIG. 13b illustrates the steps of another embodiment of the method of ascertaining the creeping torque. The routine is started at 570, and the block 571 denotes the furnishing of required parameters and/or measured values as well as system input values and mathematical functions or characteristic fields or characteristic values. The block 572 denotes the inquiry to ascertain whether the creeping torque which was calculated at the instant $t_{n-1}$ is less than a preselectable maximum value. If such is the case, the next inquiry (denoted by the block 573) involves a determination whether such value of creeping torque is less than a preselectable value. If such is the case, the creeping torque is ascertained (block 574) in accordance with a function $f_1(t)$ before the clutch torque is matched with the creeping torque (block 575), and the routine is terminated at 576. If the inquiry denoted by the block 573 is answered in the negative, the creeping torque is calculated (block 577) in accordance with the function $f_2(t)$ before the clutch torque is set (as denoted by the block 575) and the procedure is terminated at 576. If the inquiry denoted by the block 572 is negative, the clutch torque is caused to match the maximum value (block 578), and the procedure is terminated at 576.

The method according to FIG. 13b denotes a procedure during creeping according to which the buildup of creeping torque essentially takes place in two stages or steps with the functions $f_1$ and $f_2$, each of these functions permitting a different but rapid buildup of the creeping torque. The two functions can be linear, square or other functions but it is preferred if the function $f_1$ permits a more rapid buildup of the creeping torque than the function $f_2$. For example, the preselectable value according to the block 573 can constitute the engagement point of the torque transmitting system, namely that condition of engagement at which a transmission of torque begins. However, the preselectable point can also constitute a point denoting a transmissible torque higher than that at the engagement point.

Figure 14A:
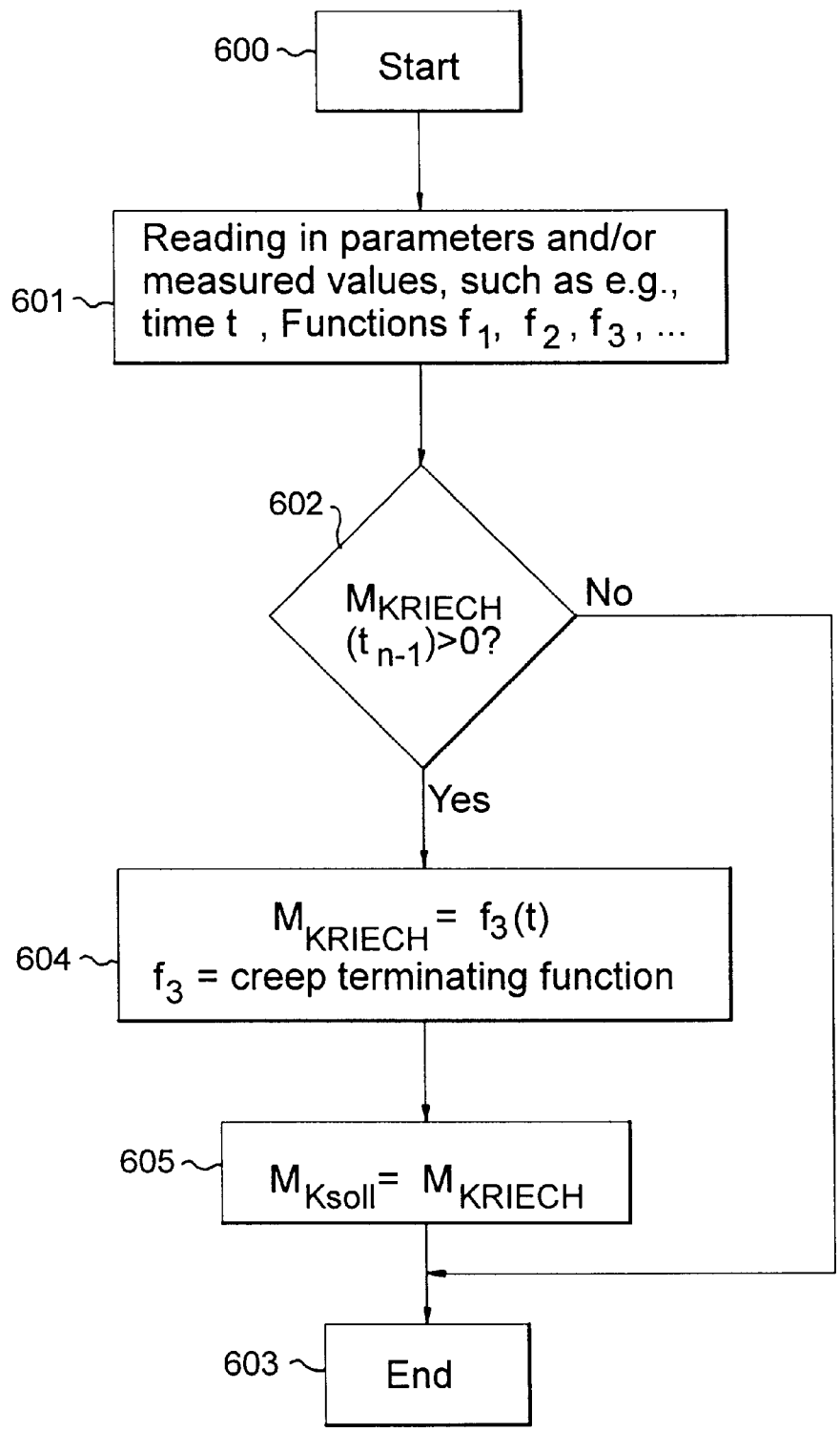

FIG. 14a illustrates a procedure upon completion of a creeping operation, for example, as a result of actuation of a brake. The block 600 denotes the start of the procedure and the block 601 denotes the introduction of necessary parameters and/or measured values or system input values, such as for example the time, the engine RPM, the throttle valve angle α or the function $f_1$, $f_2$ or $f_3$ or characteristic curves or characteristic fields. The block 602 denotes the inquiry to ascertain whether the creeping torque is greater than zero. If such is not the case, the procedure is terminated as indicated by the block 603. If the creeping torque at the instant $t_{n-1}$ is greater than zero, the step denoted by the block 604 involves a determination of creeping torque at the instant $t_n$ in accordance with the function $f_3(t)$ wherein $f_3$ is a creep termination function which determines the buildup of creeping torque. The block 605 denotes the next-following step of matching the clutch torque with the creeping torque which was determined by the step denoted by the block 604. The creep terminating function can be a linear as well as another function according to which the creeping torque is reduced essentially to zero in response to the actuation of a brake or another initiation of termination of the creeping operation.

Figure 14B:
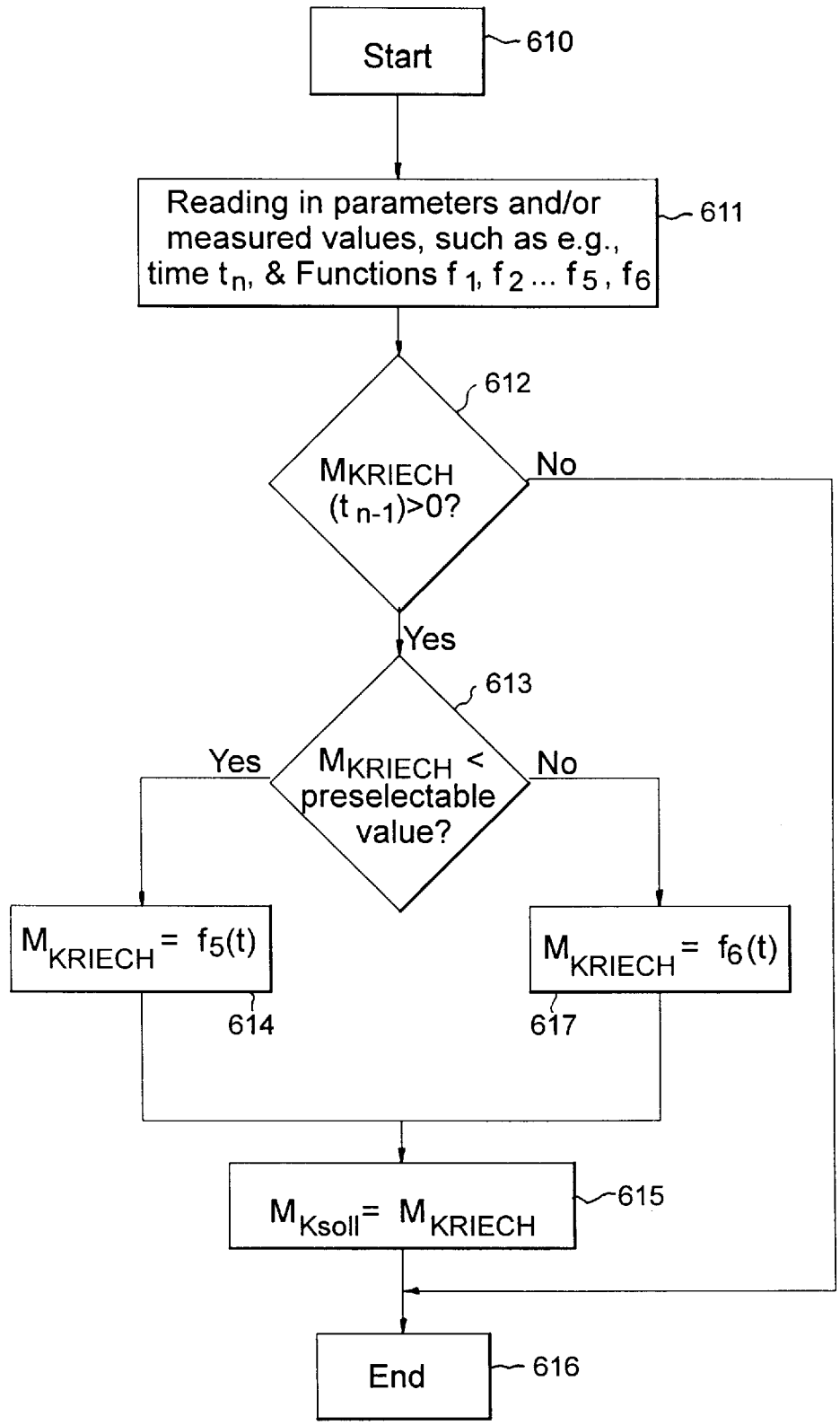

FIG. 14b illustrates a modification of the procedure according to FIG. 14a. The block 610 denotes the start of the procedure and the block 611 indicates the furnishing of parameters and/or measured values as well as functions, characteristic fields or characteristic values which are required for the calculation of creeping torque. The block 612 is indicative of the inquiry whether the creeping torque which was effective at the instant $t_{n-1}$ is greater than zero. If such is the case, the block 613 indicates a determination whether the creeping torque is less than a preselectable value. If this, too, is the case, the creeping torque is determined at 614 in accordance with a function $f_5(t)$, and the block 615 denotes a setting of desired clutch torque in accordance with the ascertained creeping torque before the procedure is terminated at 616. If the inquiry at 613 is answered in the negative, the creeping torque is determined at 617 in accordance with the function $f_6(t)$ before the desired clutch torque is set at 615 in accordance with the creeping torque. If the inquiry at 612 is answered in the negative, the procedure is thereupon terminated at 616 so that the creeping torque is reduced essentially to zero. The functions, such as the functions $f_5(t)$ and $f_6(t)$ which denote a reduction of creeping torque can exhibit different dependencies upon time in order to achieve a multi-stage reduction of the creeping torque.

A determination of clutch torque to match the creeping torque, as indicated by the blocks 554, 575, 605 and 615, need not be carried out invariably if a different inquiry or decision in accordance with the aforedescribed methods is being carried out, for example, if an inquiry was made whether the clutch torque is determined in accordance with a processed value or in accordance with a value which is independent of the creeping torque, provided that certain conditions are satisfied.

Figure 15:
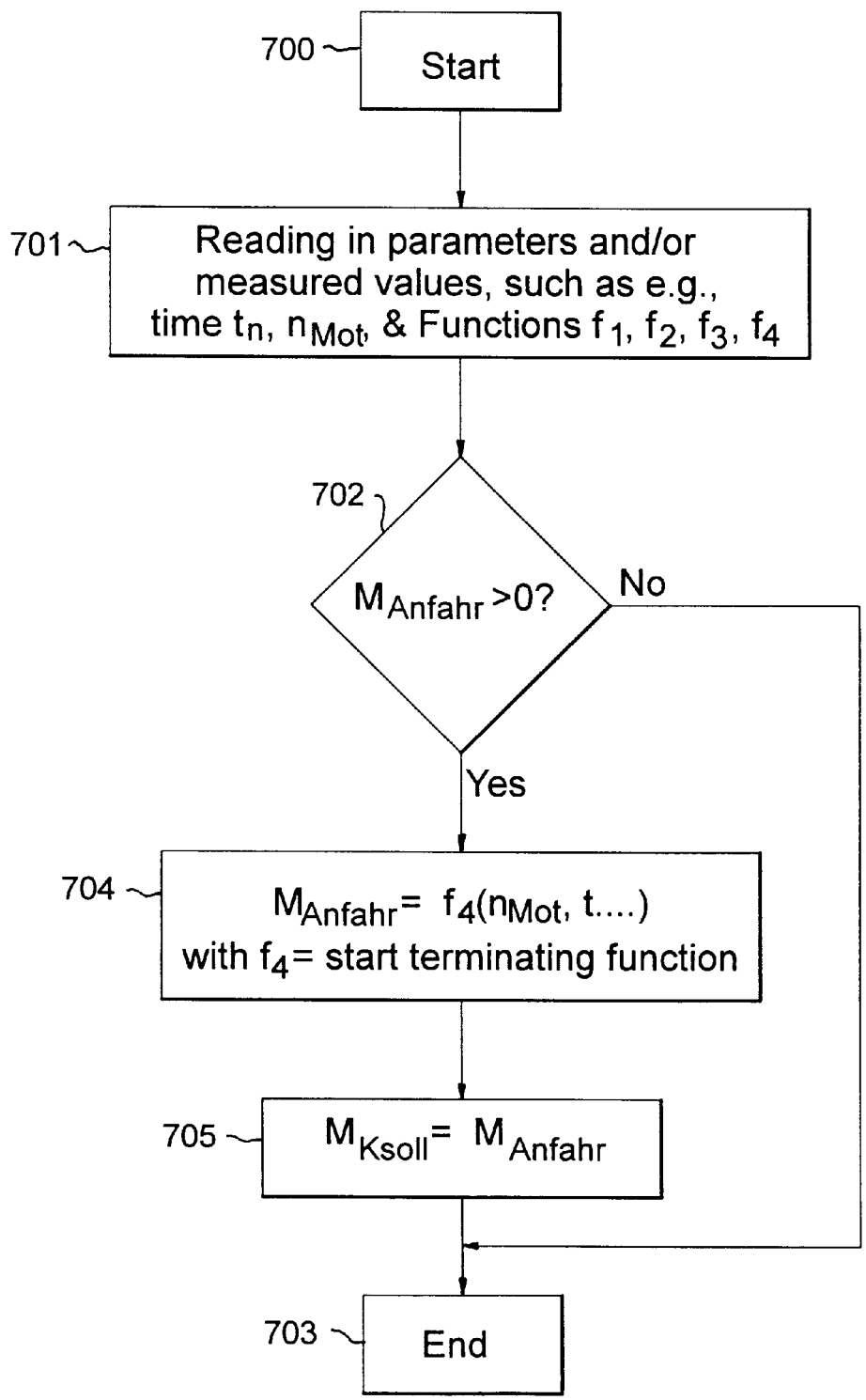

FIG. 15 illustrates the steps of a method of terminating the starting procedure. The procedure is started at 700, and the block 701 denotes the entry of necessary parameters and/or measured values as well as functions, the time, for example the engine torque or the engine RPM as well as the throttle valve angle. The block 702 denotes an inquiry whether the starting torque $M_{Anfahr}$ is greater than zero. If such is not the case, the procedure is terminated a 703. However, if the starting torque exceeds zero, the starting torque is determined (at 704) in accordance with the function $f_4(n_{Mot})$. The function $f_4$ is a starting operation terminating function which depends, for example, upon the engine RPM or time or other parameters. Once the starting torque is determined in accordance with the starting operation terminating function, the desired clutch torque can be set (block 705) in accordance with the starting torque. The step denoted by the block 705 can be omitted if the desired clutch torque is selected in a different way to disengage the clutch, such as in accordance with one of the previously described procedures.

For example, and referring to the block 306 in FIG. 7, the aforedescribed procedure in accordance with FIG. 15 can be carried out to disengage the clutch subsequent to or in the course of a starting operation if the starting operation is terminated in response to the application of a brake. The starting operation terminating function can be carried out in one, two or more than two stages but, as a rule, it is of advantage if the starting torque is reduced as expeditiously as possible. It can also be of advantage if a rapid initial reduction is followed by a reduction to a second value.

Figure 16:
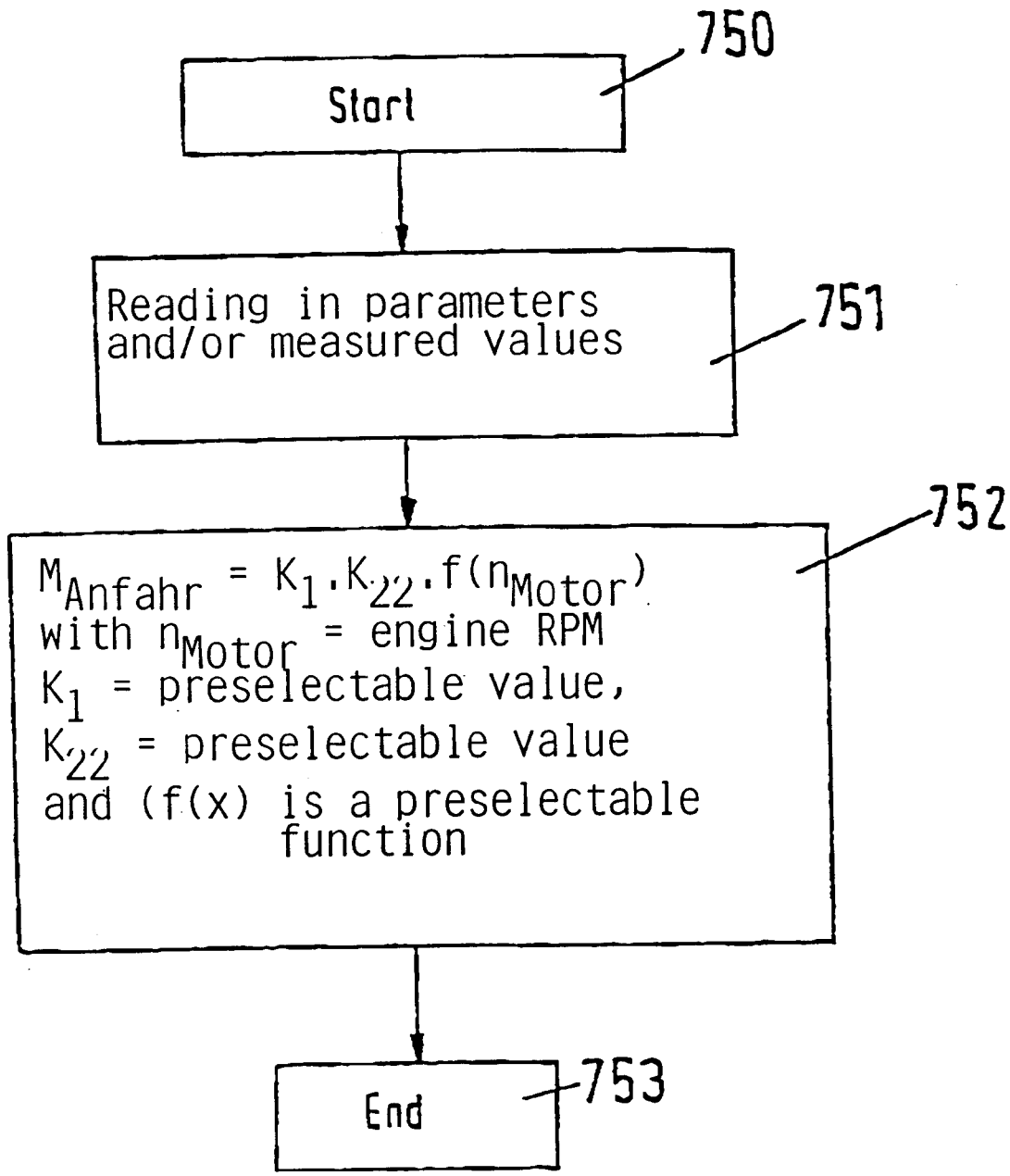

FIG. 16 shows a modification of a method of determining the starting torque. The block 750 denotes the start of the procedure, and the block 751 denotes the furnishing of parameters and/or measured values. The block 752 denotes a determination of the starting torque $M_{Anfahr}$, for example, by resorting to the function $M_{Anfahr}=K_1 \times K_{22} \times f(n_{Motor})$ wherein $n_{Motor}$ is the engine RPM and $K_1$ and $K_{22}$ are preselectable values which can vary in dependency upon operating conditions, and the function f is a preselectable function. For example, the function f can be a function of time or of the position of the throttle valve or the engine torque. The procedure is terminted at 753.

Figure 17:
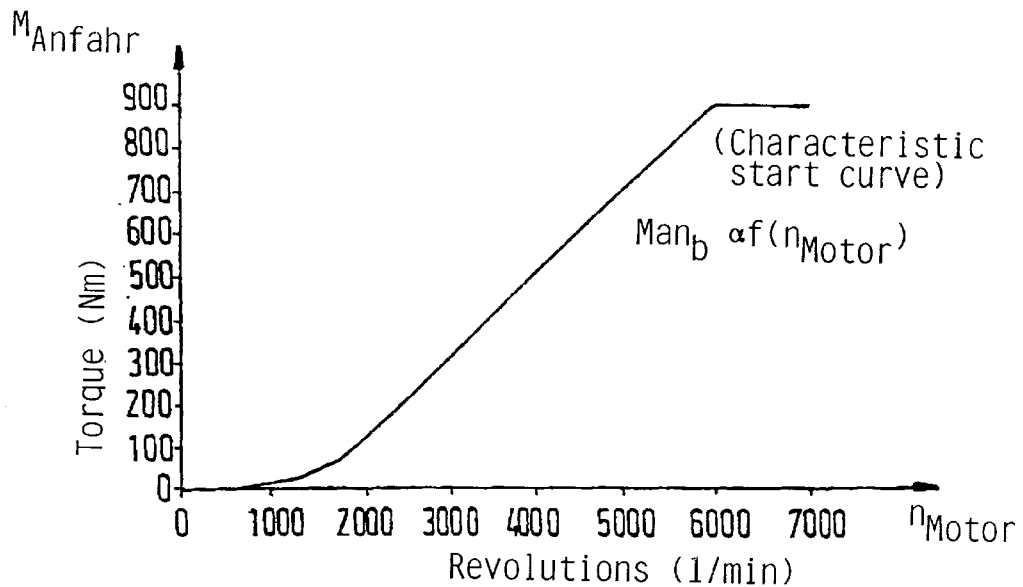

FIG. 17 shows a diagram wherein the starting torque $M_{Anfahr}$ is represented as a function of the engine RPM $n_{Motor}$. Such representation of the starting torque in dependency upon the engine RPM can also be called a characteristic starting curve, the clutch torque being determined as being proportional to the function of the engine RPM. It can be seen that, at low rotational speeds, the starting torque rises progressively, for example, quadratically. For higher rotational speeds, such as for example from 2,000 revolutions per minute to approximately 6,000 revolutions per minute, the starting torque rises essentially linearly with the engine RPM.

Figure 18:
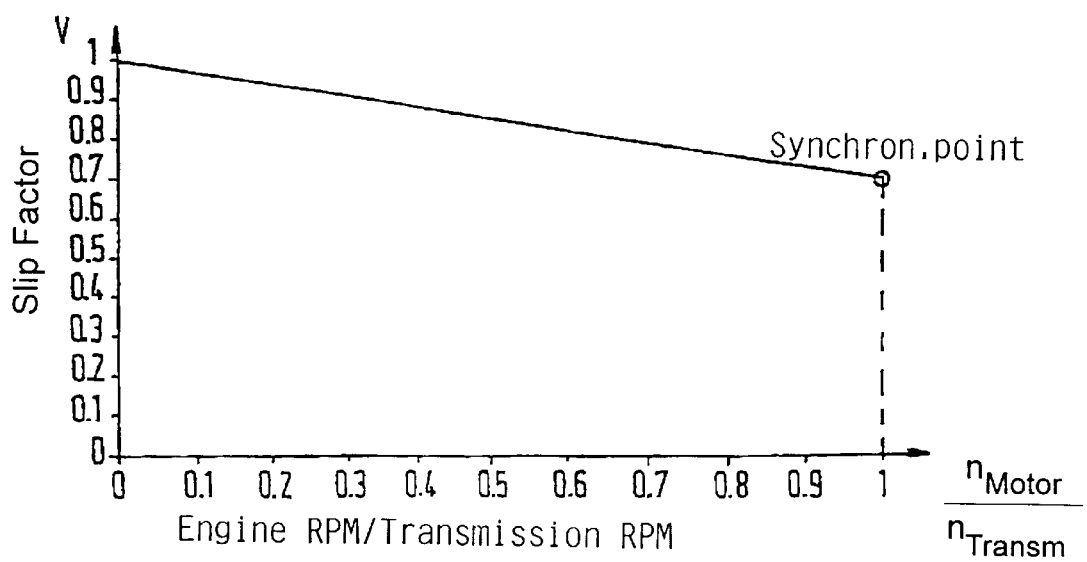

FIG. 18 shows the factor V as a function of the ratio between the engine RPM and the transmission RPM, such factor V being introduced to ensure that, during starting, shifting into gear takes place without shocks and the desired clutch torque is reduced by the factor V in the course of a starting operation. If the slip is pronounced, then V=1, the slip being the ratio between the engine RPM ($n_{Motor}$) and the transmission RPM ($n_{Transm}$). At the synchronization point, V is approximately 0.7 or a value other than 1 which permits for a comfortable starting.

Figure 19:
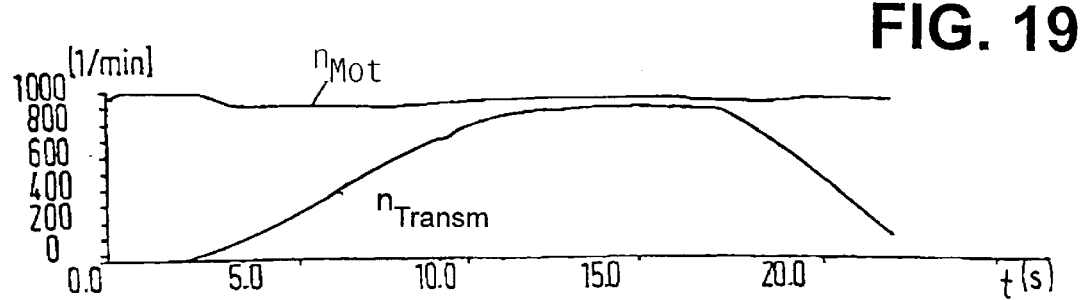
Figure 20:
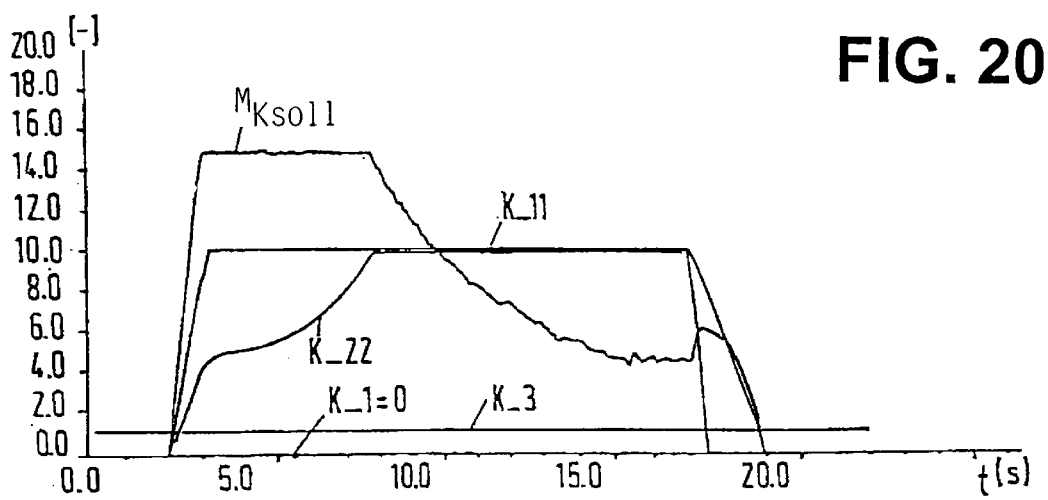

FIG. 19 shows the engine RPM $n_{Mot}$ and the transmission RPM $n_{Transm}$ as functions of time t. FIG. 20 illustrates the desired clutch torque $M_{Ksoll}$ as well as the factors $K_1$, $K_3$ and $K_{11}$ and $K_{22}$ as functions of time. The desired clutch torque $M_{Ksoll}$ is ascertained in such a way that it applies as follows:

$$M_{Ksoll}=K_1 \times K_{11} \times V \times |M_{Motor}-M_{Consumer}|+$$

$$+K_3 \times K_{22} \times |K_M * M(n_{Motor})-K_G * M(n_{Transm})|.$$

The preselectable factors $K_1$, $K_{11}$, $K_3$ and $K_{22}$ are selected in accordance with the required conditions and in accordance with the operating point. The above equation further contains the engine torque $M_{Motor}$ and torques $M_{Consumer}$ attributable to the presence of auxiliary consumers so that the calculation takes into consideration only that torque which is actually available. Furthermore, the engine torque appears in the second term which means that the torques are determined in dependency upon the engine RPM and the transmission RPM, the factors $K_M$ and $K_G$ being weighing factors which can also be zero in order to eliminate the influence of one or another value.

In the event of a creeping operation, $K_1$ is set to equal zero and $K_3$ is set to one or another constant value so that only the second term is resorted to for the calculation of a clutch torque such as creeping torque, and the starting operation is ascertained exclusively as a function of slip, namely the difference between the engine- and transmission RPM.

To start a creeping operation, the factor $K_{22}$ decides—in dependency upon its progress—the behavior while the vehicle is creeping, and the transmission RBM and engine RPM are caused to conform accordingly. For a comfortable starting operation, the creeping torque is applied in several stages. Before the creeping torque reaches approximately 15 newton-meters, the parameter $K_{22}$ is incremented linearly. Once the creeping torque is reached, the parameter $K_{22}$ is set in such a way that the equation of regulation ascertains a clutch torque of 15 newton-meters in spite of variable slip. Due to a reduction of slip, the parameter $K_{22}$ in the representation of FIG. 20 reaches its maximum permissible upper threshold value after approximately 8 seconds. In view of the limitation of the parameter $K_{22}$ to such upper threshold value, the clutch torque thereupon begins to decrease proportionally with the slip. However, it can also be of advantage is the factor $K_{22}$ is selected in such away that the clutch torque, such as the creeping torque $M_{Ksoll}$, assumes a constant value.

Figure 21:
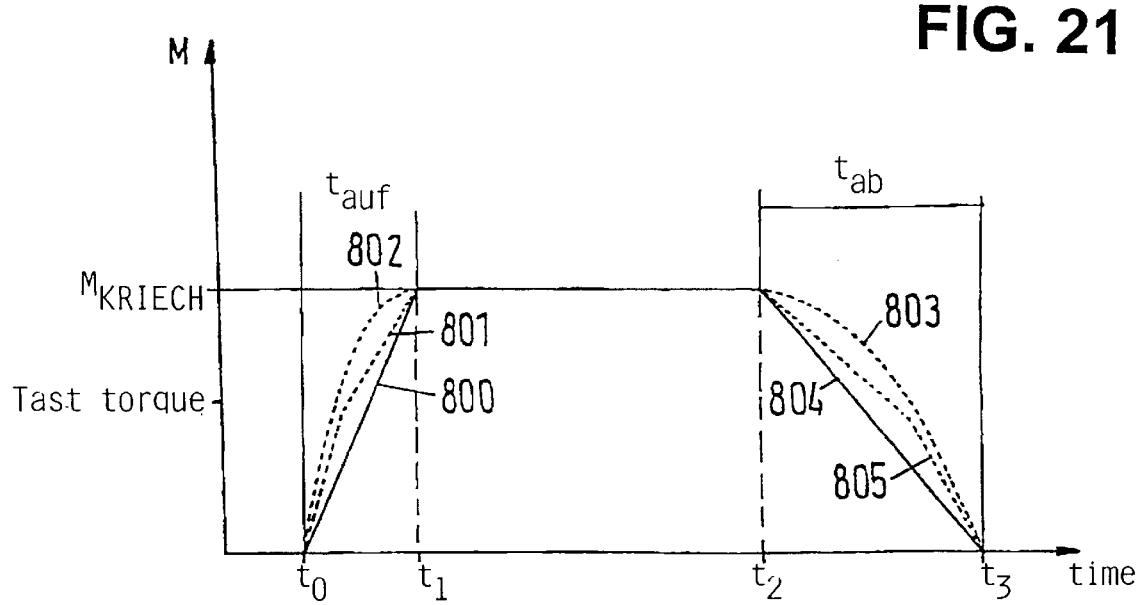

FIG. 21 illustrates the progress of creeping torque $M_{KRIECH}$ as a function of time, the creeping operation being started at $t_0$. The curves 800, 801 and 802 can be put to use as potential variants to increase the creeping torque, the rise of creeping torque from zero to the value $M_{KRIECH}$ taking place within the time interval $t_{auf}$. During the interval between $t_1$ and $t_2$, the creeping torque remains constant before, for example as a result of the application of a brake, the creeping torque is reduced during the interval $t_{ab}$, namely from the instant $t_2$ to the instant $t_3$. Again, the curves progressing as at 803, 804 and 805 can be resorted to for a reduction of the creeping torque. In an advantageous manner, the first increase of the creeping torque takes place by way of a first ramp as a function of time to a fraction of the ultimate value of the creeping torque $1/x*M_{Kriech}$, such as for example to half $\frac{1}{2}*M_{Kriech}$ of the creeping torque, and a second rise follows thereafter by way of a further ramp as a function of time from the fraction of the creeping torque to the ultimate value of the creeping torque $M_{Kriech}$. The two ramps as functions of time can have different slopes, it being of advantage if the first ramp is steeper than the second ramp.

The creeping torque, namely the torque which can be transmitted by the clutch to effect a creeping of the vehicle, is controlled while the engine is running, the gas pedal or load lever is not actuated and the brakes are not applied, so that the clutch can transmit a small torque and such torque suffices to slowly set the vehicle in motion. The increase and/or reduction of the creeping torque is effected by way of the ramp functions, for example, as a function of time, it being possible to utilize a single ramp function or more than one ramp function until completion of the buildup of creeping torque or during a reduction to desired torque. For example, the first buildup of creeping torque can be effected by way of a faster ramp, and the next-following buildup to the desired torque can take place by way of a slower ramp. For example, the faster ramp can take place at 30 Nm/s or within the range of from 10 Nm/s to 50 Nm/s. The slower ramp, for example, can take place with 10 Nm/s or within the range of from 2 Nm/s to 20 Nm/s. Analogously, a reduction of the creeping torque can be effected by way of two ramps as a function of time. The first ramp reduces, as a function of time, the creeping torque from the actual value of the ultimate creep torque $M_{Kriech}$ to a fraction $1/y$ of the creeping torque $1/y*M_{Kriech}$ and, thereafter a second ramp reduces, as a function of time the value $1/y*M_{Kriech}$ essentially down to zero. The two ramps can exhibit different slopes but it is of advantage if the slope of the second ramp exceeds that of the first ramp.

During the buildup of creeping torque, the first ramp can take place faster or slower or, in many instances of use, at the same speed as the second ramp. During a reducton of creeping torque, it is of advantage if the procedure is reversed. The ultimate value of the first ramp is preferably in the range of from 5 Nm to 30 Nm, and the ultimate range of the second ramp is preferably in the region of from 10 Nm to 100 Nm, most preferably in the range of from 20 Nm to 50 Nm.

In response to actuation of a brake, the creeping torque is reduced by way of a creep terminating function as a function of time, for example, at 20 Nm/s.

In response to actuation of the gas pedal in the course of a creeping operation, the creeping operation is terminated and followed by a starting operation, and there takes place the determination of starting torque, for example, based on the extent of actuation of the gas pedal. For example, the torque which can be transmitted by the clutch can continue to be controlled by the creeping torque as long as the starting torque does not at least match or exceed the creeping torque. Only at such time will a shift from the creeping function to the starting function take place for regulation of torque which can be transmitted by the clutch.

When the gas pedal is released, the clutch remains at first disengaged, for example, for a predeterminable period of time, e.g., one second, before the creeping torque is built up during the next-following interval.

The buildup of a creeping torque can take place in all gears of the transmission but preferably only in the driving gears such as the first and second forward gears and the reverse gear.

It is particularly advantageous if the creeping torque is regulated or controlled in dependency on speed so that the speed of the vehicle is essentially constant in the course of a creeping operation. To this end, the speed of the vehicle or the wheel RPM value furnished by at least one wheel RPM sensor or a transmission RPM when the transmission is in a known gear can be utilised as a parameter for the controlling or regulating operation in order to conform the creeping torque in such a way that the result is a constant speed.

The transmission can be a mechanical manually shiftable transmission or a transmission which is automated by means of an actuating unit. Furthermore, the transmission can be an automatic transmission such as a stepped automatic transmission or an infinitely variable cone type transmission.

The RPM for starting the vehicle, such as the starting RPM, can be determined as a function of the throttle valve angle, or of the engine torque and/or engine RPM, as well as a function of time.

The following universal equation is valid for the global regulation:

$$Msoll = K\_11 * K\_1 * Verschl * [Mmot - Mver] + \qquad \text{(Eq. 1.0)}$$
$$K\_22 * K\_3 * Verschl * [M(nmot, fpwinkel) -$$
$$M(nget, fpwinkel)$$

With the desired clutch torque Msoll, factors $K\_11, K\_1$, $K\_22$ and $K\_3$, a wear Verschl and with the engine torque Mmot and with consumer torques Mver, these being adapted to depend upon the engine RPM nmot, the transmission RPM $n_{Get}$ and and the throttle valve angle fpwinkel.

From the above, it follows for the RPM regulation:

$$Msoll = K\_22 * Verschl * M(nget, fpwinkel) + \qquad \text{(Eq. 1.1)}$$
$$K\_22 * Verschl * [M(nmot, fpwinkel) -$$
$$M(nget, fpwinkel)]$$

Herein, the individual parts or shares are being designated as torque part 1 resp. 2. Based on the Equation 1.1, one thus arrives at a somewhat more generalized representation:

$$Msoll = kp\_mom\_anteil\ 1 + kp\_mom\text{-}anteil \qquad \text{(Eq. 1.2)}$$

Based on the applicable friction torque characteristic fields (M(nmot, fpwinkel) resp. M(nget, fp\_winkel), of the value Verschl and the factor $K\_22$, one determines the individual parts of the torque. To begin a starting operation, the factor K-22 is shifted from a low value (brake applied) to one. In the event of a normal starting operation without oscillations of the transmission, the portions in which the transmission RPM appears are omitted. There remains a purely engine RPM oriented desired torque $$Msoll = K\_22 * Verschl * M(nmot, fpwinkel) \qquad \text{(Eq. 1.3)}$$

There is further realized a function "Abfahrt abbrechen" (abort the starting operation). It renders possible the establishment of a transition between an engine RPM oriented desired torque (hereafter designated as centrifugal force principle) and a slip RPM oriented torque (converter principle). To this end, the torque part 1 is lowered from its maximum value based on the characteristic field calculation in stepwise fashion back to zero. In order to realize this, the maximum rise/fall of the torque part 1 is determined by a gradient barrier, a limit of the maximum gradient.

The functionality of the RPM regulation should be optimized. This should take place in such a way that one still ensures the possibility of a tie-in into the global regulation.

The optimised RPM regulation can be expressed as follows:

$$Msoll = K\_22 * Verschl * M(nmot, fpwinkel) + K\_3 *$$

$$*[M(nmot) - M(nget)] \quad \text{(Eq. 2.1)}$$

$$Msoll = \text{Torque part 1} + \text{torque part 2}$$

For the calculation of the torque part 1, one employs a friction torque characteristic field M(nmot, fp_winkel) with 16*16 support locations. This characteristic field assigns a desired torque to the engine RPM and to the angle of the gas pedal. The value Verschl (wear) is calculated as heretofore on the basis of a characteristic curve the input of which is constituted by the speed ratio. Upon initialization, the factor K_22 is caused to assume its designated value.

As far as its designated value is concerned, the torque part 2 corresponds to torque part in the condition driving but the value of K3 varies. For the calculation of RPM-dependent torques, discrete characteristic curves are utilized for the engine- and transmission RPM.

Altering of the two torque parts, upwardly as well as downwardly, is limited by gradients.

During initializing of regulation of the RPM, the factors K_22 and K_3 are determined in such a way that, for itself alone, the torque part 1 or 2 corresponds to the entire previous desired torque. Thus, it applies that:

$$K\_22 = Msollalt / (Verschl * M(nmot, fp\_winkel))$$

$$k\_3 = Msollalt / ([M(nmot) - M(nget)])$$

The background of such initialising is that, independently of the decision which principle (centrifugal force or converter) is being applied, the desired torque should not exhibit any jumps.

In the next step, the factors K_3 and K_22 are led to their intended values with corresponding increments/decrements.

Decision Regarding Compensation:

The function decision regarding compensation is invariably calculated for each scanning step. This furnishes assistance in deciding whether one adheres to the centrifugal force principle or shifts over to the converter principle. In contrast to heretofore employed decisions re compensation into which the engine torque was being introduced, and in order to enhance the sturdiness of the apparatus, the decision is now carried out with the throttle valve signal.

As concerns the decision regarding compensation, decision is rendered on the basis of the following logic for the purpose of selecting that control principle which is to be put to use for the regulation of RPM:

If the signs of the engine torque and slip were the same, the decision was in favor of the centrifugal force principle. This applies, e.g., for normal starting operations. The converter principle was relied upon if the signs were different, e.g., in the event of an aborted start.

The basic consideration was that, if the signs are the same, a corresponding clutch torque must exist at the synchronization point because only this rendered it desirable to establish at such point a stationary point of dwell (the engine and the transmission were to remain connected to each other). The engine will undergo an acceleration by itself if the engine torque is positive. If no clutch torque is available at the synchronization point, there will be no establishment of a stationary point with a slip RPM equal to zero. This, however, is necessary in order to carry out a starting operation. Based on the above reasoning, transition was made from engine torque to the throttle valve signal but the engine RPM is being taken into consideration. The appearance of the decision matrix is now as follows:

| Situation | Gas pedal | Engine RPM | Slip | Torque part 1 | Torque part 2 |
|---|---|---|---|---|---|
| Pre-filling | =0 | <1200 (LL + 400) | >0 | increasing to target value | reducing, target value = zero |
| Rolling out | =0 | <1200 (LL + 400) | <0 | reducing, target value zero | increasing to target value |
| Abort start | =0 | >1200 (LL + 400) | >0 | reducing, target value zero | increasing to target value |
| Rolling out | =0 | >1200 (LL + 400) | <0 | reducing, target value zero | increasing to target value |
| | >0 | | >0 | increasing to target value | reducing, target value =0 |
| | >0 | | <0 | reducing, target value =0 | increasing to target value |

In a stationary case, the compensation decision effects that a torque portion is always set to zero whereas the other corresponds to its target value. Owing to such decision, it is now possible to select a corresponding control principle for the clutch in dependency on the prevailing situation.

Initializing of Torque Parts

In the event of a shift from the converter- to the centrifugal force principle or vice versa, it is desirable to always carry out one initialization routine. A first step involves a determination regarding the actual utilization of the torque parts 1 and 2. Based upon a comparison of target values with actual values of the torque parts, decision is made concerning the carrying out of the initialization. For example, if a shift is being made from the converter principle to the centrifugal force principle and, at such time, the target value of torque part 1 exceeds the actual sum of part 1 and part 2, the part 1 is occupied in advance with the sum of parts 1 and 2 and the part 2 is set to zero. The target value of the part 1 is reached thereafter as a result of incrementing the torque part 1.

The appearance of the concrete decision matrix for the initializing is set up as follows (the following abbreviations apply): M1, M2: Torque part 1 resp. 2 M1_ZW, M2_ZW: Target value Torque part 1 resp. 2

| Shift from: | Marginal condition | Initializing Part 1 | Initializing Part 2 |
|---|---|---|---|
| Centrifugal force to converter principle | M1 + M2 > M2_ZW | M1 + M2 − M2_ZW | M2_ZW |
| Centrifugal force to converter principle | M1 + M2 < M2_ZW | 0 | M1 + M2 |
| Converter to centrifugal force principle | M1 + M2 > M1_ZW | M1_ZW | M1 + M2 − M1_ZW |
| Converter to centrifugal force principle | M1 + M2 < M1_ZW | M1 + M2 | 0 |

Such initializing ensures that the shifting from the one to the other strategy takes place without torque jumps and that it is possible to make changes within preselected gradients.

Transition to Torque Control

The shifting from RPM- to torque regulation takes place in the event of synchronism and kme value is greater than or equals one. Since, at the synchronizing point, the target value of torque part 2 in the RPM regulation is zero, torque stability in part 2 is ensured on transition from RPM- to torque regulation.

If one considers the torque part 1, the stationary point during starting is located where the clutch torque equals the engine torque. Errors resp. inaccuracies are taken into consideration by a corresponding initializing of the consumer value in the torque regulation.

It then applies:

$$Mverbraucher = Mmotormoment - Msollalt/kme$$

Thus, this also ensures a torque stability.

The functionality shall be specifically pointed out once more with reference to the following examples:

a) Prefilling: Creep with/without Brake:

In this case, the compensation decision calls for the centrifugal force principle. Thus, the torque part 2 remains at zero. The torque part 1 is being calculated in dependency upon the wearing-away function and the friction torque characteristic field as follows:

$$M\_soll = K\_22 * Verschl * M(nmot, fp\_winkel)$$

Figure 22:
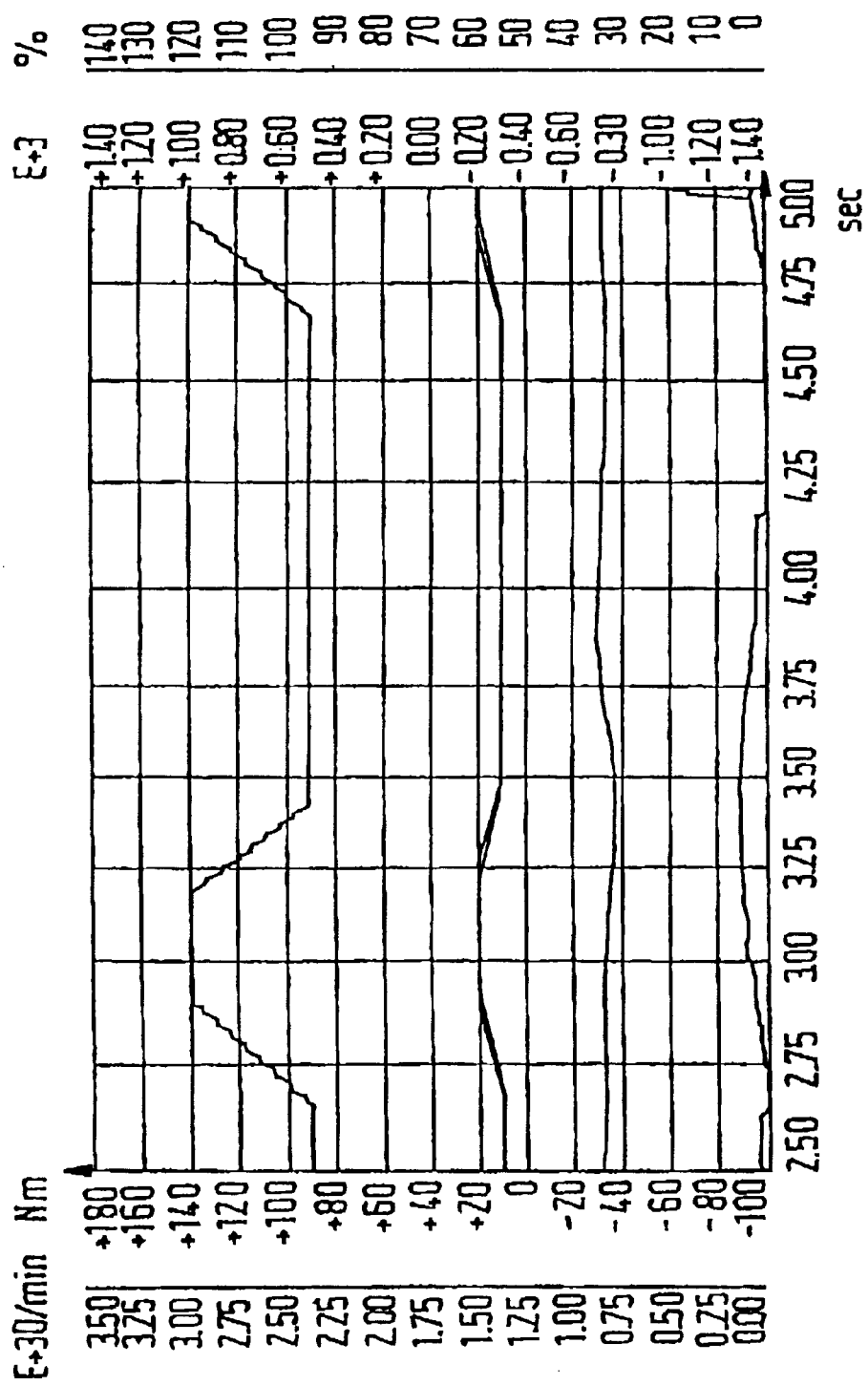
Figure 23:
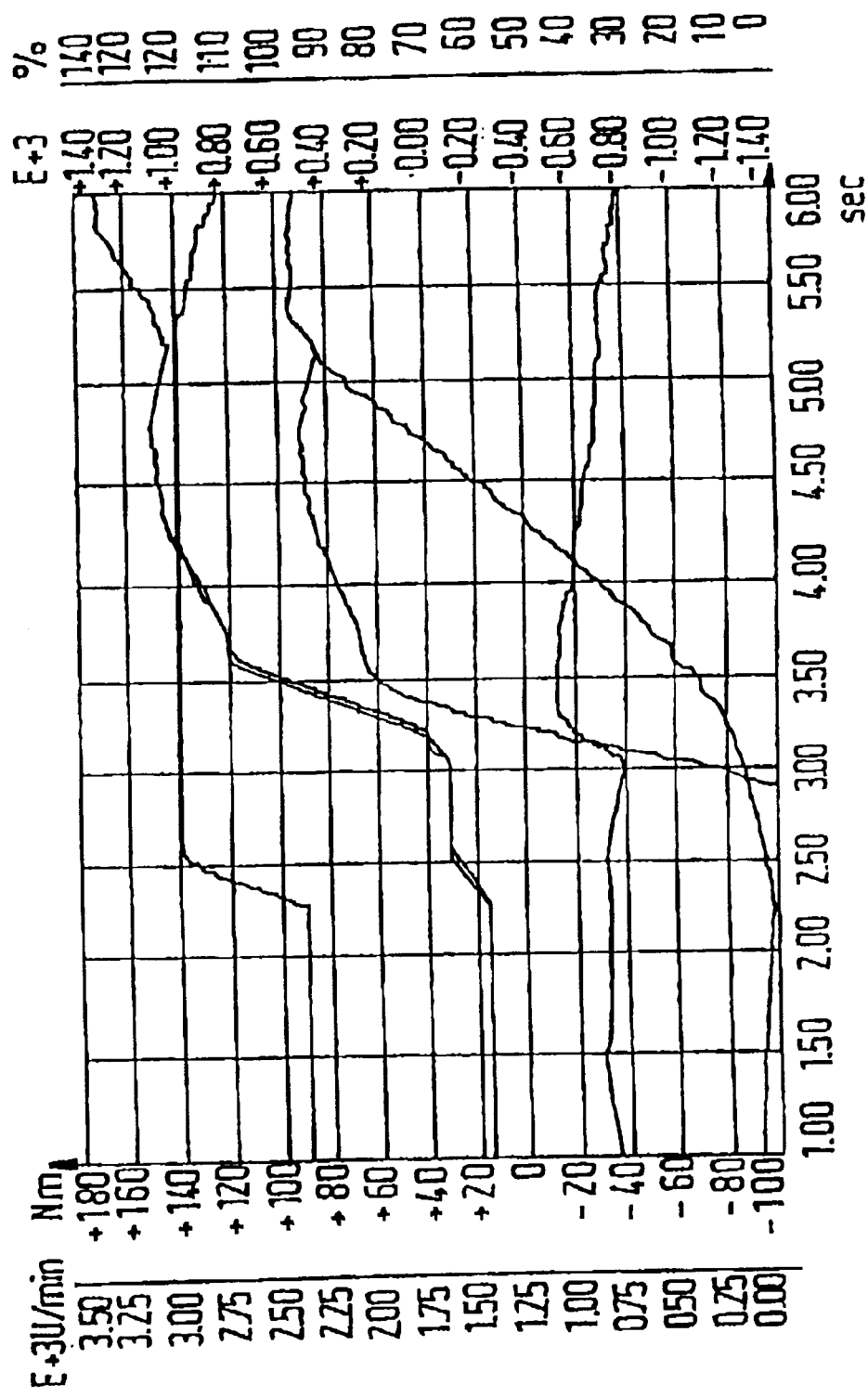
Figure 24:
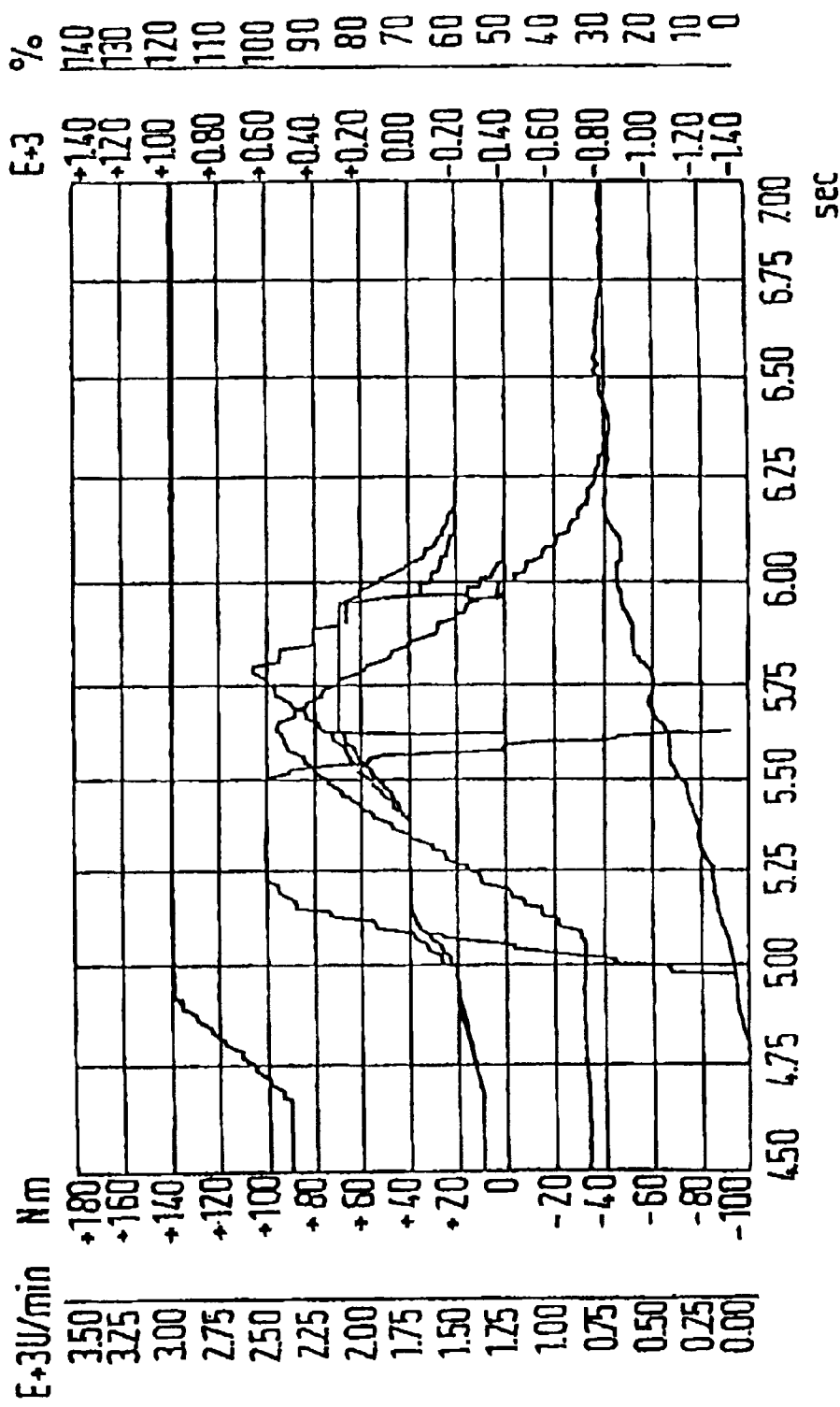

Due to variation of K_22 in dependency upon the brake (small value when the brake is applied/ value 1.0 when the brake is not applied), one can obtain a variable clutch torque, see FIG. 22.

b) "Normal" Starting:

For normal starting, there is required at the synchronous point a clutch torque which, for example, is above 20 Nm. Such driving situation can be mastered by means of the centrifugal force principle. The torque part 2 is zero, the same as during prefilling, and the part 1 is established in a manner analogous to a), see FIG. 23:

$$M\_soll = K\_22 * Verschl * M(nmot, fp\_winkel)$$

c) Abortion of the Start:

In the first step, the desired torque is established as at b). If the driver steps off the gas pedal, the compensating decision carries out a transition from the centrifugal force- to the converter principle. To this end, and due to initializing of the torque parts, the part 1 is abruptly returned to zero; the part 2 is set to the earlier value of the part 1. In the next step, the sought-after value is approached by means of a ramp (gradient value approx. 200 Nm/s), see FIG. 24).

Due to optimizing of the RPM regulation, it was possible to ensure and achieve a mode of operation which is less prone to disturbances, together with an improved functionality.

In the case of a frictional torque characteristic field which produces a desired torque on the basis of the engine RPM and the throttle valve angle, the desired torque is normally strongly dependent upon the throttle valve. Such pronouced dependency entails a rise of desired torque in response to retraction of the gas pedal in the course of a starting operation. Such rise is not expected by and is uncomfortable to the operator.

For the above reason, the strategy was modified in such a way that the characteristic field receives only a modified gas pedal signal, namely a signal corresponding to the maximum gas pedal angle which developed during starting.

The utilized RPM regulation can be expressed as follows:

$$Msoll = K\_22 * Verschl * M(nmot, fp\_winkel)$$

The presently resorted to application provides that, when the throttle valve angles are small, the starting rotational speeds are low and, if the throttle valve angle is increased, a torque is built up only at higher rotational speeds. Thus, the friction torque characteristic field contains different characteristic curves for different angles of the gas pedal.

Due to the utilization of such family of characteristic curves, the desired torque is strongly dependent upon the throttle valve angle at identical engine RPMs. Such behavior is comfortable in response to depression of the gas pedal because the engine is more free to increase its RPM; however, such behavior has unpleasant consequences when the extent of depression of the gas pedal is reduced or the gas pedal is released. At such time, the operator does not anticipate any further acceleration of the motor vehicle during release of the gas pedal. However, due to an increase of torque as a result of retraction of the gas pedal, there does develop a further acceleration. In addition, there develops an unpleasant shock which is not acceptable for reasons of comfort.

A surge of torque during retraction of the gas pedal while the vehicle is started should be reduced or prevented.

In order to achieve this, a modified throttle valve signal is being utilized for the friction torque characteristic field. This correction is being carried out in such a way that, for the starting, only the heretofore developed maximum gas pedal angle is being evaluated. Therefore, the desired torque during starting is now calculated as follows:

$$Msoll = K\_22 * Verschl * M(nmot, MAX[fp\_winkel])$$

If, in the course of a starting operation, the driver effects a pronounced depression of the gas pedal, for example, to about 90%, the friction torque characteristic field initially selects a relatively slowly rising characteristic curve from the friction torque characteristic field. If the gas pedal is thereupon caused to return to about 20% of its maximum depressed position, no jump to the corresponding curve takes place in the characteristic field, i.e., the 90% characteristic curve is being adhered to. Though this results in higher synchronous rotational speeds, such behavior is not uncomfortable to the operator and might not be noticed at all.

The maximum value provision is erased when a synchronism is reached or when the gas pedal angle returns to zero.

Due to the introduction of the maximum value prerequisite during calculation of the desired torque out of the friction torque characteristic field, the comfort during retraction of the gas pedal while the vehicle is in the process of starting is considerably enhanced.

Figure 25:
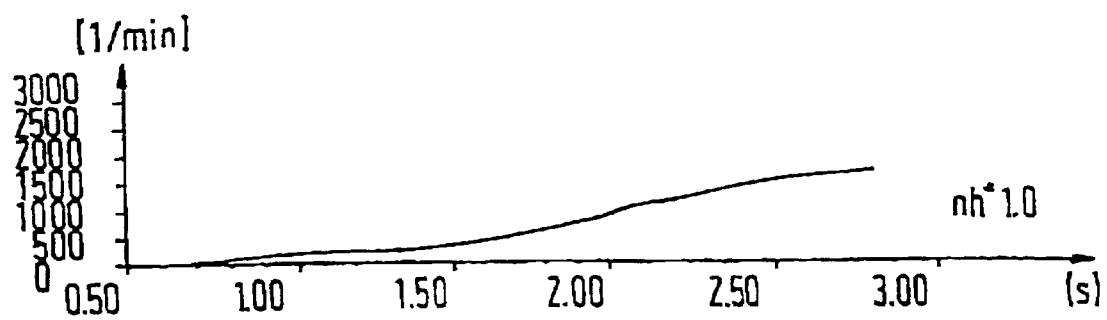
Figure 25A:
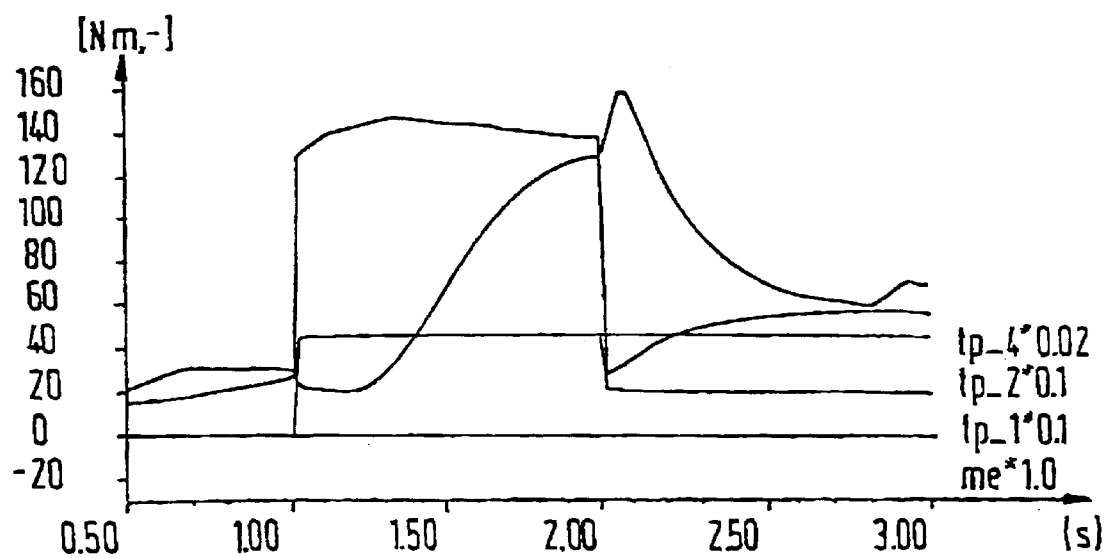

Starting without the maximum value provision, see FIGS. 25 and 25a:

Legend: nm: engine RPM, nh: transmission RPM, tp_4: Msoll, tp_2: maximum gas pedal, tp_1: gas pedal It can be seen above that, owing to retraction of the gas pedal, the desired torque (blue resp. black) undergoes a pronounced increase (time range from 2 sec.).

Figure 26:
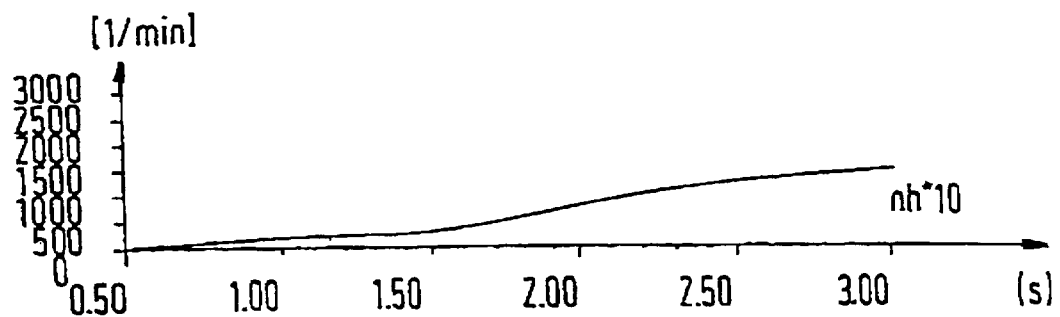
Figure 26A:
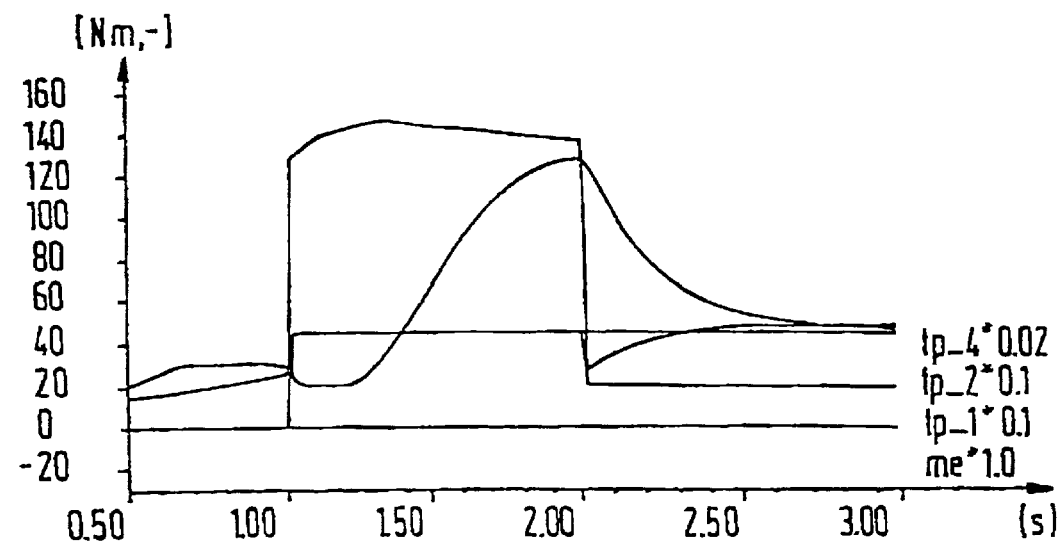

Start with maximum value provision, see FIGS. 26 and 26a:

Legend: nm: engine RPM, nh: transmission RPM, tp_4: Msoll, tp_2: maximum gas pedal, tp_1: gas pedal A rise of required pressure is prevented owing to the novel maximum value provision.

What is claimed is:

1. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining and effecting the transmission of torque by said system in accordance with at least one first predeterminable function to thus induce a creeping movement of the vehicle, and (b) means for effecting a starting movement of the vehicle in response to actuation of said load lever while said at least one brake is idle and said transmission is in gear, including means for selecting the transmission of torque by said system in accordance with at least one second predeterminable function to thus induce said starting movement of the vehicle.

2. The apparatus of claim 1, wherein said actuating means comprises at least one actuator.

3. The apparatus of claim 1, wherein said system includes an engageable and disengageable clutch.

4. The apparatus of claim 1, wherein said means for transmitting signals to said control unit includes at least one of (a) at least one sensor and (b) at least one electronic circuit.

5. The apparatus of claim 1, wherein said actuating means comprises means for adjusting the torque being transmitted by said system in dependency upon the characteristics of signals processed by said control unit.

6. The apparatus of claim 1, wherein said first function is a function of time.

7. The apparatus of claim 6, said first function is varied in dependency upon time for at least one interval of time.

8. The apparatus of claim 7, wherein said first function is varied in dependency upon at least two different functions of time during at least two intervals of time.

9. The apparatus of claim 8, wherein the variation of said first function during a first interval of time involves a rise of torque transmission from at least close to zero to a first preselectable value in dependency upon a first function of time, and the variation of said first function during a second interval of time involves a change of torque transmission from said first preselectable value to a second preselectable value in dependency upon a second function of time.

10. The apparatus of claim 7, wherein said second preselectable value is a maximum value and said actuating means is arranged to thereupon maintain said torque at least close to said maximum value.

11. The apparatus of claim 7, wherein said second preselectable value is a maximum value and the variation of said first function during a third interval of time involves a drop of torque transmission from said maximum value to a third value.

12. The apparatus of claim 9, wherein at least one of said first and second preselectable values is representative of a noticeable change of the magnitude of torque being transmitted by said system.

13. The apparatus of claim 12, wherein said noticeable change is an increase of the magnitude of torque being transmitted by said system.

14. The apparatus of claim 12, wherein said system has an operating point and said noticeable change takes place at the operating point of said system.

15. The apparatus of claim 7, wherein said first functon is one of a plurality of different functions of time including linear, square and exponential functions.

16. The apparatus of claim 7, wherein said first function is varied in dependency upon at least two different functions of time including a relatively rapid rise of torque inducing said creeping movement during a first interval of time and a slower rise of torque inducing said creeping movement during a second interval following said first interval.

17. The apparatus of claim 1, wherein said control unit further comprises means for reducing the transmission of torque by said system to a preselectable value upon a termination of said creeping movement.

18. The apparatus of claim 17, wherein said termination of creeping movement involves the application of said at least one brake.

19. The apparatus of claim 17, wherein said means for reducing the transmission of torque involves a first reduction during a first interval of time following said termination of creeping movement and a second reduction during a second interval of time following said termination of creeping movement.

20. The apparatus of claim 17, wherein said preselectable value is at least close to zero.

21. The apparatus of claim 1, wherein at least one of said first and second predeterminable functions is a preselectable function of at least one operational parameter.

22. The apparatus of claim 21, wherein said at least one operational parameter is the RPM of a rotary component of said prime mover.

23. The apparatus of claim 21, wherein said at least one operational parameter is at least one of the RPM of a rotary component of said prime mover and one of a plurality of positions of said load lever.

24. The apparatus of claim 1, wherein said first predeterminable function is selected in dependency upon at least one operational parameter.

25. The apparatus of claim 1, wherein said first predetermined function is dependent upon time.

26. The apparatus of claim 1, wherein at least one of said functions is dependent upon at least one of a plurality of operational parameters including time, the RPM of a rotary component of said prime mover, the RPM of a rotary input element of said transmission, the position of said load lever, the angle of a pivotable element of a throttle valve for said prime mover, slip between input and output portions of said system in depedency upon the difference between the RPM of said component and the RPM of said input element, and the velocity of the motor vehicle.

27. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with at least one predeterminable creeping function to thus induce a creeping movement of the vehicle, and (b) means for effecting a starting movement of the vehicle in response to actuation of said load lever while said at least one brake is idle and said transmission is in gear, including means for selecting the transmission of torque by said system in accordance with at least one predeterminable starting function to thus induce said starting movement of the vehicle, a transition from said creeping movement to said starting movement upon actuation of said load lever being effected in such a way that that the transmission of torque by said system in accordance with said at least one creeping function is shifted to transmission of torque in accordance with said at least one starting function when the magnitude of torque selected in accordance with said at least one starting function at least matches the magnitude of torque selected in accordance with said at least one creeping function.

28. The apparatus of claim 27, wherein said system includes an engageable and disengageable clutch adapted to be maintained in a selected condition of engagement.

29. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with at least one predeterminable creeping function to thus induce a creeping movement of the vehicle, and (b) means for effecting a starting movement of the vehicle in response to actuation of said load lever while said at least one brake is idle and said transmission is in gear, including means for selecting the transmission of torque by said system in accordance with at least one predeterminable starting function to thus induce said starting movement of the vehicle, a transition from said creeping movement to said starting movement upon actuation of said load lever being effected in such a way that the transmission of torque by said system in accordance with said at least one creeping function is shifted to transmission of torque in accordance with said at least one starting function when the magnitude of torque selected in accordance with said at least one starting function approximates a preselectable value.

30. The apparatus of claim 29, wherein said preselectable value is one of (i) a fraction and (ii) a multiple of said torque by said system in accordance with said at least one predeterminable creeping function.

31. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with at least one predeterminable creeping function to thus induce a creeping movement of the vehicle, and (b) means for effecting a starting movement of the vehicle in response to actuation of said load lever while said at least one brake is idle and said transmission is in gear, including means for selecting the transmission of torque by said system in accordance with at least one predetermined starting function to thus induce said starting movement of the vehicle, a transition from said creeping movement to said starting movement upon actuation of said load lever being effected in such a way that the transmission of torque by said system in accordance with said at least one creeping function is shifted to transmission of torque in accordance with said at least one starting function in response to actuation of said load lever.

32. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with a predeterminable creeping function to thus induce a creeping movement of the vehicle, and (b) means for effecting a starting movement of the vehicle in response to actuation of said load lever while said at least one brake is idle and said transmission is in gear, including means for selecting the transmission of torque by said system in accordance with a predeterminable starting function to thus induce said starting movement of the vehicle in lieu of said creeping movement in automatic response to actuation of said load lever.

33. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with a predeterminable creeping function to thus induce a creeping movement of the vehicle, and (b) means for effecting a starting movement of the vehicle in response to actuation of said load lever while said at least one brake is idle and said transmission is in gear, including means for selecting the transmission of torque by said system in accordance with a predeterminable starting function to thus induce said starting movement of the vehicle, a transition from said creeping movement to said starting movement upon actuation of said load lever being effected in such a way that the torque being transmitted by said system in accordance with said starting function is superimposed upon the transmission of torque in accordance with said creeping function in response to actuation of said load lever.

34. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with a predeterminable creeping function to thus induce a creeping movement of the vehicle, (b) means for effecting a starting movement of the vehicle in response to actuation of said load lever while said at least one brake is idle and said transmission is in gear, including means for selecting by said system the transmission of a higher torque in accordance with a predeterminable starting function to thus induce said starting movement of the vehicle, and (c) means for effecting a reduction of torque transmission and a renewed creeping movement of the vehicle, in response to an interruption of actuation of said lever, in accordance with a preselectable starting movement terminating function, a transition from selection of transmission of torque by said system in accordance with said starting movement terminating function back to transmission of torque in accordance with said creeping function taking place when the torque which was reduced in accordance with said starting torque terminating function at most matches the torque being determinable in accordance with said creeping function.

35. The apparatus of claim 34, wherein said starting movement terminating function is a preselectable function of the RPM of a rotary component of said prime mover.

36. The apparatus of claim 34, wherein said starting movement terminating function is a preselectable function of time.

37. The apparatus of claim 34, wherein said transition from selection of transmission of torque by said system in accordance with said starting movement terminating function back to transmission of torque in accordance with said creeping function takes place when the torque which was reduced in accordance with said starting movement terminating function is at least close to zero.

38. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with a predeterminable creeping function to thus induce a creeping movement of the vehicle, (b) means for effecting a starting movement of the vehicle in response to actuation of said load lever while said at least one brake is idle and said transmission is in gear, including means for selecting by said system the transmission of a higher torque in accordance with a predeterminable starting function to thus induce said starting movement of the vehicle, and (c) means for effecting a reduction of torque transmission and a renewed creeping movement of the vehicle in accordance with said creeping function in immediate response to an interruption of actuation of said lever.

39. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with a predeterminable creeping function to thus induce a creeping movement of the vehicle, (b) means for effecting a starting movement of the vehicle in response to actuation of said load lever while said at least one brake is idle and said transmission is in gear, including means for selecting by said system the transmission of a higher torque in accordance with a predeterminable starting function to thus induce said starting movement of the vehicle, and (c) means for effecting a reduction of torque transmission and a renewed creeping movement of the vehicle, in response to an interruption of actuation of said lever, in accordance with a preselectable starting movement terminating function, a transition from selection of transmission of torque by said system in accordance with said starting movement terminating function to transmission of torque in accordance with a creeping function taking place when the torque which was reduced in accordance with said starting torque terminating function at least approximates zero.

40. Apparatus for regulating the operation of an automatically actuatable torque transmitting system in a power train of a motor vehicle wherein the power train further comprises a prime mover and a transmission shiftable into a plurality of gears, the vehicle further including at least one actuatable brake and an operator-actuatable load lever for the prime mover, comprising a signal processing control unit; means for transmitting signals to said unit; and means for actuating said system in response to signals from said unit, said unit including (a) means for effecting a creeping movement of the vehicle when said transmission is in gear, said at least one brake is idle, and said load lever is not actuated, including means for determining a controlled transmission of torque by said system in accordance with a predeterminable creeping function to thus induce a creeping movement of the vehicle, (b) means for effecting a starting movement of the vehicle in response to actuation of said load lever while said at least one brake is idle and said transmission is in gear, including means for selecting by said system the transmission of a higher torque in accordance with a predeterminable starting function to thus induce said starting movement of the vehicle, and (c) means for effecting a reduction of torque transmission and a renewed creeping movement of the vehicle, in response to an interruption of actuation of said lever, in accordance with a preselectable starting movement terminating function, a transition from selection of transmission of torque by said system in accordance with said starting movement terminating function to transmission of torque in accordance with a creeping function taking place when the torque which was reduced in accordance with said starting torque terminating function at least approximates zero and thereupon remains at least substantially unchanged for a preselected period of time.

41. The apparatus of claim 40, wherein the duration of said period of time is between 1 millisecond and 10 seconds.

42. The apparatus of claim 40, wherein the torque during said period of time is zero.

43. The apparatus of claim 40, wherein the torque during said period of time exceeds zero.

* * * * *

UNITED STATES PATENT AND TRADEMARK OFFICE
CERTIFICATE OF CORRECTION

PATENT NO.    : 5,989,153
DATED         : Nov. 23, 1999
INVENTOR(S)   : Robert FISCHER, et al.

It is certified that errors appear in the above-identified patent and that said Letters Patent is hereby corrected as shown below:

On title page, [54] Title, "DEVICE FOR DRIVING A TORQUE TRANSMISSION SYSTEM"

To --APPARATUS FOR CONTROLLING A TORQUE TRANSMISSION SYSTEM--.

Signed and Sealed this

Third Day of April, 2001

Attest:

NICHOLAS P. GODICI

Attesting Officer

Acting Director of the United States Patent and Trademark Office